US011036979B2

(12) United States Patent
Blanco et al.

(10) Patent No.: US 11,036,979 B2
(45) Date of Patent: Jun. 15, 2021

(54) DEVICE, SYSTEM AND METHOD FOR GENERATING AN ALERT AND AN AUTOMATIC SEARCH FOR A CANDIDATE SUBJECT

(71) Applicant: MOTOROLA SOLUTIONS, INC., Chicago, IL (US)

(72) Inventors: Alejandro G. Blanco, Ft. Lauderdale, FL (US); Scott M. Alazraki, Davie, FL (US); Shervin Sabripour, Plantation, FL (US); Patrick D. Koskan, Jupiter, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 405 days.

(21) Appl. No.: 15/922,452

(22) Filed: Mar. 15, 2018

(65) Prior Publication Data

US 2019/0286901 A1 Sep. 19, 2019

(51) Int. Cl.
*G06K 9/00* (2006.01)
*H04N 7/18* (2006.01)
*G08B 13/196* (2006.01)

(52) U.S. Cl.
CPC ..... *G06K 9/00536* (2013.01); *G06K 9/00671* (2013.01); *G06K 9/00771* (2013.01);
(Continued)

(58) Field of Classification Search
CPC ........... G06K 9/00536; G06K 9/00671; G06K 9/00771; G06K 2009/00738; G08B 13/19693; G08B 13/19697; G08B 13/19613; G08B 13/19621; G08B 13/19641; G08B 13/19656; H04N 7/181; H04N 1/00; H04N 1/00137; H04N 1/00148; H04N 1/2137; H04N 21/2368; H04N 21/2743; H04N 21/4223; H04N 21/4302;
(Continued)

(56) References Cited

U.S. PATENT DOCUMENTS 9,386,050 B2 7/2016 Oswald
9,412,366 B2 8/2016 Wilensky et al.
(Continued)

OTHER PUBLICATIONS

ISA/EP, International Search Report and Written Opinion, May 15. 2019, re PCT International Patent Application No. PCT/US2019/020692.

*Primary Examiner* — Michael J Vanchy, Jr.
(74) *Attorney, Agent, or Firm* — Perry + Currier, Inc.

(57) ABSTRACT

A device, system and method for generating an alert and an automatic search for a candidate subject is provided. The device monitors one or more data sources to identify a candidate subject. The device determines, from rules for rating candidate subjects stored in a memory, a rating of the candidate subject. When the rating meets a first threshold: the device transmits, to one or more communication devices, an alert identifying the candidate subject. When the rating meets a second threshold, lower than the first threshold: the devices provides, a classifier defining the candidate subject to an object recognition engine to cause the object recognition engine to automatically search for the candidate subject, using the classifier, in multimedia data received at one or more edge devices. The multimedia data may include images.

20 Claims, 20 Drawing Sheets

(52) U.S. Cl.
    CPC . *G08B 13/19693* (2013.01); *G08B 13/19697* (2013.01); *H04N 7/181* (2013.01)

(58) Field of Classification Search
    CPC ........... H04N 21/4394; H04N 21/8106; H04N 21/84; H04N 21/435; H04N 2201/0084; H04N 5/2251; H04N 5/232; H04N 5/23203; G06F 3/165; G11B 2020/10546; G11B 20/10527; G11B 27/10; H04R 3/005; H04S 2400/15
    See application file for complete search history.

(56) References Cited

U.S. PATENT DOCUMENTS

| | | | |
|---|---|---|---|
| 9,443,005 | B2 | 9/2016 | Khandekar |
| 9,684,826 | B2 | 6/2017 | Dubuque |
| 2010/0231714 | A1* | 9/2010 | Flores .............. G08B 13/19613 348/143 |
| 2013/0038737 | A1 | 2/2013 | Yehezkel et al. |
| 2014/0368601 | A1* | 12/2014 | deCharms ............. H04L 65/403 348/14.02 |
| 2015/0206419 | A1 | 7/2015 | Johnson et al. |
| 2015/0310730 | A1 | 10/2015 | Miller et al. |
| 2015/0374303 | A1* | 12/2015 | Gelbman ............. A61B 5/0022 600/476 |
| 2017/0109609 | A1* | 4/2017 | Hill ........................ G06Q 30/00 |
| 2017/0177715 | A1 | 6/2017 | Chang et al. |
| 2017/0323540 | A1* | 11/2017 | Boykin ............ G08B 13/19613 |

* cited by examiner

DEVICE, SYSTEM AND METHOD FOR GENERATING AN ALERT AND AN AUTOMATIC SEARCH FOR A CANDIDATE SUBJECT

BACKGROUND OF THE INVENTION

First responders, such as police officers, generally receive All Points Bulletins (APBs) and/or Be-On-the-Look-Outs (BOLOs), to notify them to look for persons, vehicles, or other subjects of interest. These APBs/BOLOs may be provided to the first responders at a pre-shift check-in, in paper form or communicated verbally by a watch commander. The APBs/BOLOs may also be provided in real time to communication devices of the first responders, for example over the air as a voice group call, and/or in electronic form as an incident is unfolding (e.g. such as a missing child or bank robber or car witnessed in a drive-by shooting and the like). The first responders generally need to recall all of these APBs/BOLOs during a shift which can easily be overwhelming. Similarly, subjects of the APBs/BOLOs may easily be missed when first responders are distracted and/or not looking in a direction where the subject of the APBs/BOLOs is located. Hence, organizations tend to limit the number of APBs/BOLOs that are released to better focus the first responders on "most wanted" and/or "most important" subjects. As such there is often a high threshold for deciding to issue an APB/BOLO, meaning many potential APBs/BOLOs do not happen. Furthermore, the decision as to which APBs/BOLOs to issue can be expensive and painstaking work.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
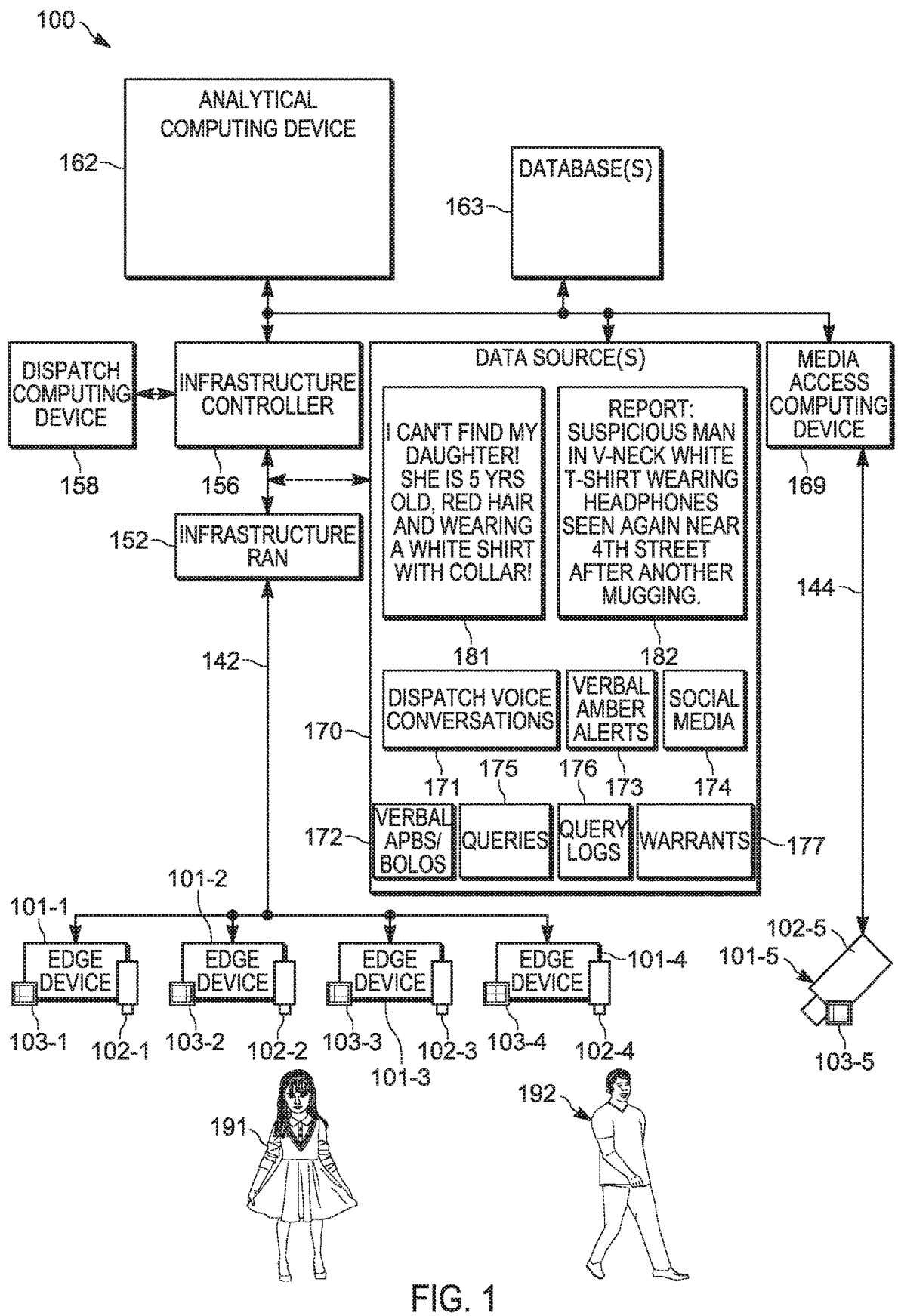
FIG. 1 is a system for generating an alert and an automatic search for a candidate subject in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication unit; a memory storing rules for rating candidate subjects; and a controller configured to: monitor, via the communication unit, one or more data sources to identify a candidate subject; determine, from the rules, a rating of the candidate subject; when the rating meets a first threshold: transmit, via the communication unit, to one or more communication devices, an alert identifying the candidate subject; and when the rating meets a second threshold, lower than the first threshold: provide a classifier defining the candidate subject to an object recognition engine to cause the object recognition engine to automatically search for the candidate subject, using the classifier, in multimedia data received at one or more edge devices. The multimedia data may include images received at the one more edge devices.

Another aspect of the specification provides a method comprising: monitoring, at a controller, via communication unit, one or more data sources to identify a candidate subject; determining, at the controller, from rules for rating candidate subjects stored in a memory, a rating of the candidate subject; when the rating meets a first threshold: transmitting, using the controller, via the communication unit, to one or more communication devices, an alert identifying the candidate subject; and when the rating meets a second threshold, lower than the first threshold: providing, using the controller, a classifier defining the candidate subject to an object recognition engine to cause the object recognition engine to automatically search for the candidate subject, using the classifier, in multimedia data received at one or more edge devices. The multimedia data may include images received at the one more edge devices.

Attention is directed to FIG. 1, which depicts a system 100 for generating an alert and an automatic search for a candidate subject. The system comprises a plurality of edge devices 101-1, 101-2, 101-3, 101-4, 101-5, each of which are associated with a respective imaging device 102-1, 102-2, 102-3, 102-4, 102-5 and a respective microphone 103-1, 103-2, 103-3, 103-4, 103-5. For clarity, the plurality of edge devices 101-1, 101-2, 101-3, 101-4, 101-5 will be interchangeably referred to hereafter, collectively, as edge devices 101 and, generically, as an edge device 101. Similarly, the imaging devices 102-1, 102-2, 102-3, 102-4, 102-5 will be interchangeably referred to hereafter, collectively, as imaging devices 102 and, generically, as an imaging device 102. Similarly, the microphones 103-1, 103-2, 103-3, 103-4, 103-5 will be interchangeably referred to hereafter, collectively, as microphones 103 and, generically, as a microphone 103. The edge devices 101 are described in more detail below with respect to FIG. 2 and FIG. 3, however each of the edge devices 101 may comprise a portable mobile device (e.g. the edge devices 101-1, 101-2, 101-3, 101-4) and the like, and/or a fixed surveillance device such as a closed-circuit camera device (e.g. the edge device 101-5) and the like. The edge devices 101-1, 101-2, 101-3, 101-4 may hence be referred to as mobile edge devices, while the edge device 101-5 may be referred as a fixed edge device. Indeed, the imaging devices 102-1, 102-2, 102-3, 102-4 and the microphones 103-1, 103-2, 103-3, 103-4 of the edge devices 101-1, 101-2, 101-3, 101-4 may be portable imaging devices and microphones, while the imaging device 102-5 and the microphones 103-5 may be fixed. However other types of edge devices are within the scope of present embodiments. For example, an edge device may be a device which provides an entry point into a communication network and which may include, but is not limited to, phones, smartphones, radios, but also routers, routing switches, integrated access devices (IADs), multiplexers, and a variety of metropolitan area network (MAN) and wide area network (WAN) access devices.

Each of the edge devices 101-1, 101-2, 101-3, 101-4 may be configured for wirelessly communicating over respective wireless link(s) 142 via a wireless infrastructure radio access network (RAN) 152 (described in more detail below) and via corresponding transceiver circuits. These devices may be referred to as communication devices and are configured to receive inputs associated with users, such as responders and/or provide outputs to the users in addition to communicating information to and from other communication devices and the infrastructure RAN 152. However, one or more of the edge devices 101, such as the edge device 101-5, may be configured for wired communication via a respective communication link 144, the link 144 may also be at least partially wireless.

The infrastructure RAN 152 is illustrated in FIG. 1 as providing coverage for the edge devices 101-1, 101-2, 101-3, 101-4. In general, the infrastructure RAN 152 communicatively couples the edge devices 101-1, 101-2, 101-3, 101-4 to a single infrastructure controller 156, which in turn is in communication with a dispatch computing device 158, which may include one or more dispatch terminals (not depicted) operated by one or more dispatchers. The infrastructure controller 156 further couples the edge devices 101-1, 101-2, 101-3, 101-4 to an analytical computing device 162, for example via an internet protocol (IP) network (not depicted, but represented by lines there between), and the like.

The infrastructure RAN 152 may include one or more fixed antennas, fixed terminals, and the like (not depicted) which couple the infrastructure RAN 152 to the infrastructure controller 156 (e.g., a radio controller, call controller, push-to-talk (PTT) server, zone controller, mobility management entity (MME) d, base station controller (BSC), mobile switching center (MSC) device, site controller, push-to-talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices (e.g. a larger number of edge devices 101). Indeed, while only four edge devices 101-1, 101-2, 101-3, 101-4 are depicted, the system 100 may include fewer than four, or greater than four mobile edge devices, for example tens, hundreds, or even thousands of mobile edge devices.

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device.

It is understood by a person of skill in the art in FIG. 1 that an IP network is present which couples the infrastructure controller 156 to the analytical computing device 162, as well as one or more databases 163 and/or a media access computing device 169 described in more detail below. Such an IP network may comprise one or more routers, switches, local area networks (LANs), wireless local area networks (WLANs), wide area networks (WANs), access points, or other network infrastructure, including but not limited to, the public Internet.

The analytical computing device 162 may comprise one computing device, and/or a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and interconnected via electronic and/or optical interconnects. Although not shown in FIG. 1, one or more proxy servers or load balancing servers may control which one or more computing devices perform any part or all of the electronic digital assistant service.

As depicted, the system 100 further comprises the one or more databases 163 accessible to the analytical computing device 162 via an IP network and/or the edge devices 101, and may include databases such as a long-term video storage database, an offender database (which may include, but is not limited to, facial recognition images to match against), a databases of subjects of interest, a database of candidate subjects, a database of object classifiers, a database of amber alerts, or other types of databases. The databases 163 may further include all or a portion of the databases described herein as being provided at the infrastructure controller 156. Furthermore, one or more of the databases 163 may further store logs of queries to one or more of the databases 163.

The databases 163 may include other types of databases including, but not limited to cartographic database of streets and elevations, a historical or forecasted weather database, a traffic database of historical or current traffic condition. In some embodiments, the databases 163 may be maintained by third parties (for example, the National Weather Service or a Department of Transportation, respectively).

Furthermore, one or more of the databases 163 may alternatively be referred to as a cloud repository device and/or a cloud repository as data stored at one or more of the databases 163 may be stored "in the cloud".

As shown in FIG. 1, the databases 163 may be communicatively coupled with the analytical computing device 162 and/or the infrastructure RAN 152 (e.g. via an IP network) to allow the analytical computing device 162 and/or the edge devices 101 to communicate with and retrieve data from the databases 163, for example via an IP network and/or via the infrastructure controller 156. In some embodiments, the databases 163 are commercial cloud-based storage devices. In some embodiments, the databases 163 are housed on suitable on-premises database servers. The databases 163 of FIG. 1 are merely examples. In some embodiments, the system 100 additionally or alternatively includes other databases that store different information. In some embodiments, the databases 163 disclosed herein and/or additional or other databases are integrated with, or internal to, the infrastructure controller 156.

Although the edge devices 101-1, 101-2, 101-3, 101-4 are illustrated in FIG. 1 as providing example imaging devices 102 and/or microphones 103 for use in capturing video and/or audio streams, other types of cameras and/or microphones could be used as well, including but not limited to, fixed or pivotable cameras and/or video cameras secured to lamp posts, and automated teller machine (ATM) video cameras, accessible via a wired or wireless network interface same or similar to that disclosed herein.

For example, as depicted, the system 100 further comprises a media access computing device 169 that may be a component of the analytical computing device 162 and/or a component of the cloud compute cluster arrangement of the analytical computing device 162 and/or a standalone computing device. Either way, the media access computing device 169 is in communication with the analytical computing device 162 and/or the edge devices 101-1, 101-2, 101-3, 101-4, for example via an IP network.

The media access computing device 169 is further configured to communicate with the imaging device 102-5 (e.g. a closed-circuit television (CCTV) camera, a video camera, and the like), as well as the microphone 103-5 of the edge device 101-5 via the link 144. The microphone 103-5 may be a component of the imaging device 102-5 (e.g. as depicted) and/or may be separate from the imaging device 102-5. Furthermore, the edge device 101-5 may be a component of a public safety monitoring system and/or may be a component of a commercial monitoring and/or private security system to which the media access computing device 169 has been provided access. The imaging device 102-5 and/or the microphone 103-5 generally generate, respectively video data (e.g. still and/or moving images) and audio data. Furthermore, while only one fixed edge device 101-5 is depicted, the system 100 may comprise tens, hundreds or even thousands of fixed edge devices.

The system 100 further comprises one or more data sources 170 which may include, but are not limited to: one or more of the imaging devices 102 and/or other camera devices; one or more of the microphones 103 and/or other audio devices; electronic transmissions from one or more communication networks (e.g. communications that occur in an IP network, wireless communication networks, and the like, including networks comprising links 142, 144); video transmissions from one or more communication networks; audio transmissions from one or more communication networks; data transmissions from one or more communication networks; verbal amber-alerts; queries to one or more databases 163 that identify subjects of interest; and logs of the queries to the one or more databases 163. Hence, the one or more data sources 170 may include any of the edge devices 101 and/or any networks of the system 100 and/or one or more of the databases 163.

For example, as depicted, the data sources 170 include various types of communications that may be exchanged between the edge devices 101, the dispatch computing device 158, the databases 163, an IP network and the like. Example communications include, but are not limited to: dispatch voice conversations 171 (e.g. between responders operating edge devices 101 and/or dispatchers at the dispatch computing device 158), verbal APBs and/or BOLOs 172 (e.g. issued by the dispatchers) (which may include, but is not limited to, video transmissions, audio transmissions and/or data transmissions from one or more communication networks), verbal amber alerts 173, social media 174 communications, live queries 175 to the databases, logs 176 of queries to the databases, warrants 177, and the like. When the communications are verbal, the analytical computing device 162 may convert such speech into text.

Furthermore, while the various communications of the data sources are described with respect to verbal and/or textual communications, in some embodiments the various communications may include multimedia data and/or images and/or video and/or audio associated with candidate subjects.

As depicted, the data sources 170 include two example communications 181, 182 each of which may be communications exchanged between the edge devices 101 and the dispatch computing device 158, and intercepted by the analytical computing device 162 monitoring a communication network (e.g. and converted to text). As depicted, each of the communications 181, 182 include information that may be used to identify candidate subjects which may be used to generate an electronic alert, such as an electronic all-points bulletin (APB), an electronic be-on-the-look-out (BOLO), an electronic amber alert, and the like. Alternatively, each of the communications 181, 182 include information which may be used to generate classifiers used by object recognition engines of the system 100 to automatically search for a candidate subject, as described in more detail below.

For example, one or more the devices of the system 100 is generally configured to perform video analytics on images received from one or more of the imaging devices 102 at the edge devices 101. In some embodiments, one or more of the devices of the system 100 may also perform audio analytics on audio received at the microphones 103 of the edge devices 101. Indeed, one or more of the devices of the system 100 may also perform analytics on multimedia data (e.g. a combination of video data and/or audio data and/or images and/or text and the like). Such video and/or audio analytics may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

In particular, such machine learning algorithms may be components of object recognition engines which may be used to identify candidate subjects at least in images received at the imaging devices 102 of the edge devices 101 and/or audio received at the microphones 103. Such object recognition engines may be located at one or more of the edge devices 101 and/or at the analytical computing device 162 as described hereafter. Indeed, while object recognitions engines are generally used to search images, object recognitions engines described herein may include a component, and/or have access to a component, such as an audio recognition engine that searches audio data. For simplicity, herein an object recognition engine will be described as being used to generically search multimedia data for candidate subjects which may include the object recognition engine searching images and/or an audio recognition engine searching audio data.

Furthermore, such object recognition engines may function via classifiers which define a candidate subject. For example, such classifiers may define a candidate subject and may be generated using descriptors, and the like, extracted from the communications 181, 182. Indeed, as depicted, each of the communications 181, 182 include descriptors which describe subjects 191, 192 each of whom may be the basis of candidate subjects. For example, the communications 181, 182 may comprise communications which respectively describe the subjects 191, 192 such that the analytical computing device 162 may generate alerts for the subjects 191, 192 and/or automatic searches for the subjects 191, 192.

For example, the communication 181 includes descriptors "daughter", "5 yrs old", "red hair" and "white shirt with collar", which describes the subject 191. Similarly, the communication 182 includes descriptors "man", "V-neck white t-shirt" and "headphones", which describes the subject 192. Hence, the communications 181, 182 may be used to extract descriptors to generate classifiers for candidate subjects, which may be used to automatically identify the subjects 191, 192 in images from the imaging devices 102.

Indeed, as described herein, a "candidate subject" is understood to be associated with data that describes and/or defines a subject and/or a potential subject and/or a subject of interest (e.g. such as the subjects 191, 192) and which may be used to generate classifiers to automatically identify the subjects 191, 192 in multimedia data from the imaging devices 102.

Furthermore, a database of candidate subjects and/or classifiers of candidate subjects may be maintained at the databases 163, for example by the analytical computing device 162, via the analytical computing device 162 maintaining such databases, as described in more detail below.

However, not all subjects identified in the data sources 170 may be candidate subjects for whom an alert is generated and/or for whom a search is initiated. For example, the analytical computing device 162 may identify a subject from the data sources 170 but decide, based on context data, that the subject does not qualify for an alert and/or a search. Such subjects may, however, also be stored in the databases 163 for later reference.

Indeed, the analytical computing device 162 may periodically and/or continuously be searching for candidate subjects in the data sources 170, and storing data, in the databases 163, defining any subjects identified in the databases 163 for later reference.

While candidate subjects are described in example embodiments as being associated with data that defines people, each candidate subject may be associated with data which defines a person and/or object and/or vehicle and/or entity identified from the data sources 170. Such candidate subjects may hence alternatively be referred to persons-objects-subjects of interest (POEs of interest).

Figure 2:
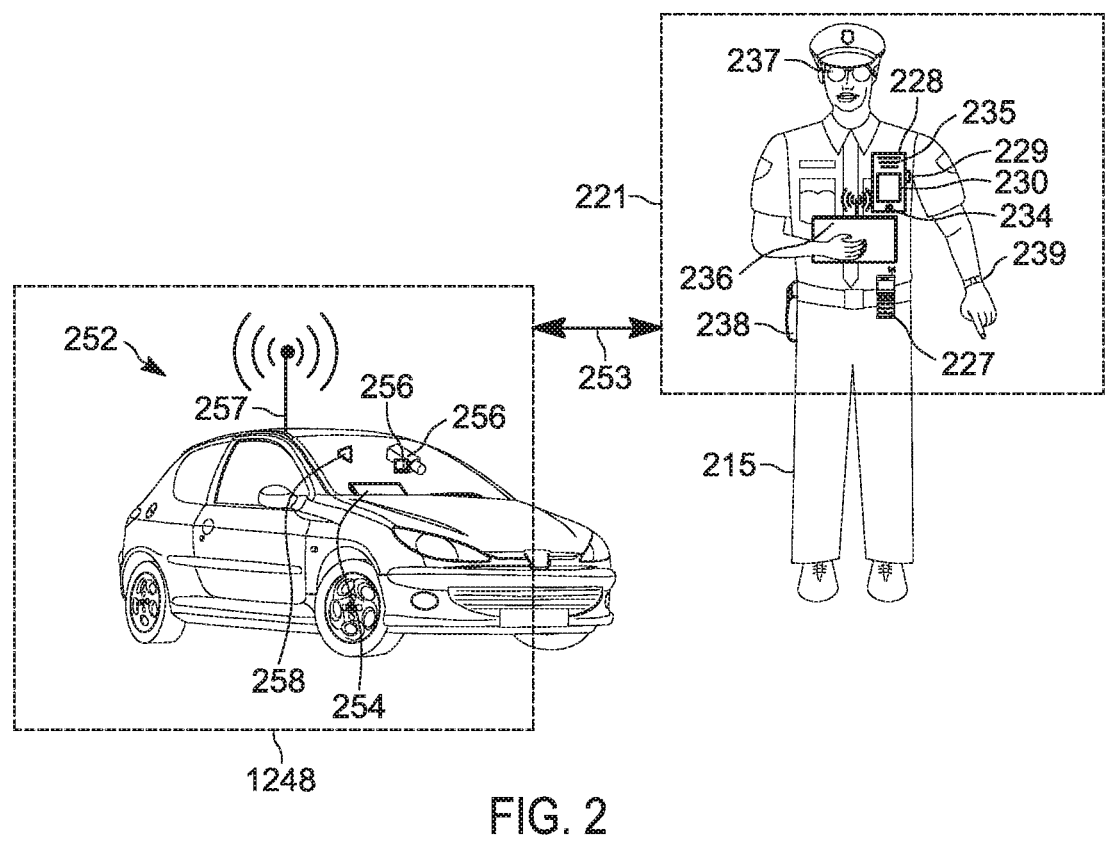
FIG. 2 depicts example edge devices in according with some embodiments.

Attention is next directed to FIG. 2 which depicts example embodiments of the edge devices 101-1, 101-2, 101-3, 101-4. As depicted in FIG. 2, a responder 215 (as depicted, a police officer) is operating and/or wearing and/or is associated with a plurality of devices which form a personal area network 221 including, but not limited to: a primary battery-powered portable radio 227, a battery-powered radio speaker microphone (RSM) video capture device 228 (which includes a push-to-talk (PTT) switch 229, a display screen 230 and a video camera 234 and a microphone 235 (which is understood by a person of skill in the art to be a component of a speaker/microphone assembly), a laptop 236 (which may include an integrated video camera and/or microphone and/or speaker and used for data applications such as incident support applications), smart glasses 237 (e.g. which may be virtual reality, augmented reality, or mixed reality glasses and which may include an integrated video camera and/or microphone and/or speaker), a sensor-enabled holster 238, and/or a biometric sensor wristband 239. While not depicted, the personal area network 221 may include other types of devices that include sensors, such as a sensor equipped vest worn by the responder 215 which may be configured to detect when the vest is impacted and/or pierced.

One or more of the edge devices 101-1, 101-2, 101-3, 101-3 may comprise one or more of the devices of the personal area network 221, such as the portable radio 227 which may act as the communication hub for the personal area network 221. Similarly, one or more of the imaging devices 102-1, 102-2, 102-3, 102-4 may comprises one or more of the video camera 234 and/or a video camera of the laptop 236 and/or a video camera of the smart glasses 237. Similarly, one or more of the microphones 103-1, 103-2, 103-3, 103-4 may comprises one or more of the microphone 235 and/or a microphone of the laptop 236 and/or a microphone of the smart glasses 237.

As depicted, the personal area network 221 is in communication with a vehicle area network 248 of a vehicle 252 via a communication link 253, which may be wireless and/or wired as desired. The vehicle 252 is equipped with a plurality of devices which form the vehicle area network 248 including, but not limited to: a mobile communication device 254, a respective vehicular video camera 255 and/or microphone 256, and coupled vehicular transceiver 257, as well as a speaker 258.

In some embodiments, one or more of the imaging devices 102-1, 102-2, 102-3, 102-4 may comprise one or more of the devices of the vehicle area network 248, such as the mobile communication device 254, which may act as the communication hub for the vehicle area network 248. Similarly, one or more of the imaging devices 102-1, 102-2, 102-3, 102-4 may comprises the video camera 255 and one or more of the microphones 103-1, 103-2, 103-3, 103-4 may comprise the microphone 256. Similarly, in some embodiments, the edge device 101-5 may be incorporated, at least temporarily, into the vehicle area network 248.

Hence, for example, one or more of the edge devices 101-1, 101-2, 101-3, 101-4 may have a configuration similar to the devices of the personal area network 221 and/or the vehicle area network 248. Indeed, the edge devices 101-1, 101-2, 101-3, 101-4 may include other types of body worn cameras such as head-mounted cameras, other types of vehicular cameras such as roof-mounted cameras, or other types of audio and/or video recording devices.

Although FIG. 1, together with FIG. 2, describes a communication system 100 generally as a public safety communication system that includes responders, such as the responder 215, generally described as a police officer and police vehicles, such as the vehicle 252 generally described as a police car or cruiser, in other embodiments, the communication system 100 may additionally or alternatively be a retail communication system including users that may be employees of a retailer and vehicles that may be vehicles for use by the employees of the retailer in furtherance of the employees' retail duties (e.g., a shuttle or self-balancing scooter). In other embodiments, the communication system 100 may additionally or alternatively be a warehouse communication system including users that may be employees of a warehouse and vehicles that may be vehicles for use by the employees of the warehouse in furtherance of the employees' retail duties (e.g., a forklift). In still further embodiments, the communication system 100 may additionally or alternatively be a private security communication system including responders that may be employees of a private security company and vehicles that may be vehicles for use by the employees of the private security company in furtherance of the private security employees' duties (e.g., a private security vehicle or motorcycle). In even further embodiments, the communication system 100 may additionally or alternatively be a medical communication system including users that may be doctors or nurses of a hospital and vehicles that may be vehicles for used in furtherance of the doctor or nurse's duties (e.g., a medical gurney or ambulance). In still another example embodiment, the communication system 100 may additionally or alternatively be a heavy machinery communication system including users that may be miners, drillers, or extractors at a mine, oil field, or precious metal or gem field and vehicles that may be vehicles used in furtherance of the miners', drillers', or extractors' duties (e.g., an excavator, bulldozer, crane, front loader). As one other example, the communication system 100 may additionally or alternatively be a transportation logistics communication system including users that may be bus drivers or semi-truck drivers at a school or transportation company and vehicles that may uses in furtherance of the drivers' duties.

Figure 3:
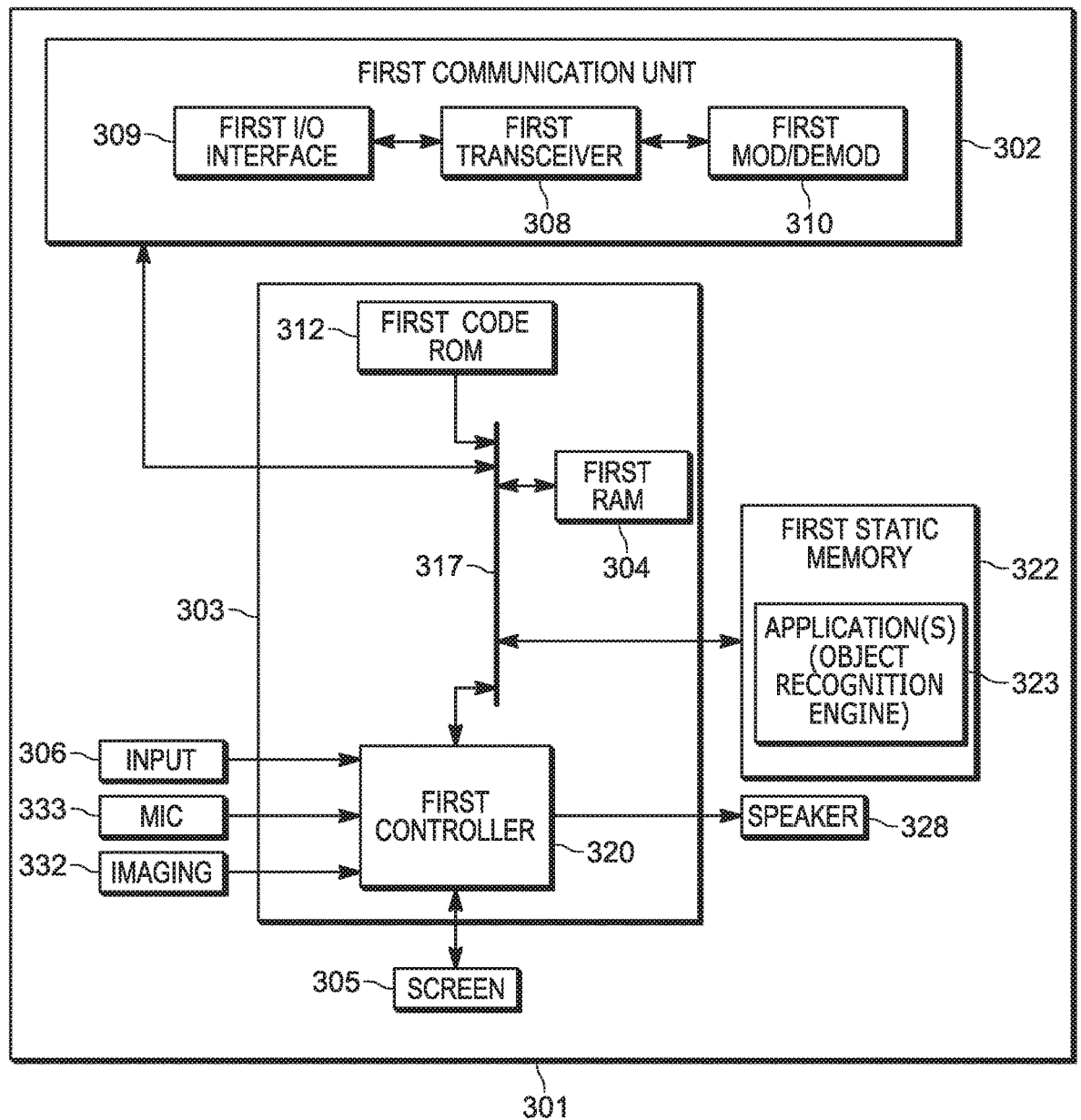
FIG. 3 is a device diagram showing a device structure of an edge device configured to perform an automatic search for a candidate subject in accordance with some embodiments.

Attention is next directed to FIG. 3 which sets forth a schematic diagram that illustrates an example edge device 301. One or more of the edge devices 101 may have a configuration similar to the edge device 301.

As depicted in FIG. 3, the example edge device 301 generally includes a first communications unit 302, a first processing unit 303, a first Random Access Memory (RAM) 304, a display screen 305, an input device 306, one or more first wireless transceivers 308, one or more first wired and/or wireless input/output (I/O) interfaces 309, a first combined modulator/demodulator 310, a first code Read Only Memory (ROM) 312, a first common data and address bus 317, a first controller 320, a first static memory 322 storing one or more applications 323 (which may include an object recognition engine), a speaker 328, an imaging device 332 and a microphone 333. The one or more applications 323 will be interchangeably referred to hereafter as the application 323, though different applications 323 may be used for different modes of the device 300. For example while the one or more applications 323 include an object recognition engine that may be used to search images for objects and/or candidate subjects, as described in more detail, the one or more applications 323 may further include an audio recognition engine that may be used to search audio data for objects and/or candidate subjects. The audio recognition engine may be a component of the object recognition engine and/or a separate component.

However, while the edge device 301 is described with respect to including certain components, it is understood that the edge device 301 may be configured according to the functionality of a specific device.

For example, as depicted, the edge device 301 represents the mobile edge devices 101-1, 101-2, 101-3, 101-4 described above with respect to FIG. 1, depending on the type of the edge device 101, the edge device 101 of FIG. 3 may include fewer or additional components in configurations different from that illustrated in FIG. 3.

For example, the edge device 301 acting as the fixed edge device 101-5 may not include one or more of the display screen 305, the input device 306, and the speaker 328.

Regardless, the imaging device 332 may be one of the imaging devices 102, and the microphone 333 may be one of the microphones 103.

As another example, in some embodiments, the edge device 301 acting as the mobile edge devices 101-1, 101-2, 101-3, 101-4 may further include a location determination device (for example, a global positioning system (GPS) receiver) as explained above. Other combinations are possible as well.

Furthermore, the edge device 301 may be communicatively coupled to other devices for example in the personal area network 221 and/or the vehicle area network 248 of FIG. 2. Hence, for example, one or more of the imaging device 332 of FIG. 3 and the microphone 333 of FIG. 3 may be external to the example edge device 301 of FIG. 3.

The example edge device 301 is described hereafter in further detail. As shown in FIG. 3, the edge device 301 includes the communications unit 302 coupled to the common data and address bus 317 of the processing unit 303. The edge device 301 may also include one or more input devices 306 (e.g., keypad, pointing device, touch-sensitive surface, etc.) and the display screen 305 (which, in some embodiments, may be a touch screen and thus also act as an input device 306), each coupled to be in communication with the processing unit 303.

The speaker 328 may be present for reproducing audio that is decoded from voice or audio streams of calls received via the communications unit 302 from other portable radios, from digital audio stored at the edge device 301, from other ad-hoc or direct mode devices, and/or from an infrastructure RAN device, or may playback alert tones or other types of pre-recorded audio.

The imaging device 332 may provide video (still or moving images) of an area in a field of view of the edge device 301 for further processing by the processing unit 303 and/or for further transmission by the communications unit 302.

The microphone 333 may be present for capturing audio from a user and/or other environmental or background audio that is further processed by the processing unit 303 and/or is transmitted as voice or audio stream data, or as acoustical environment indications, by the communications unit 302 to other portable radios and/or other communication devices.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random Access Memory (RAM) 304 and a static memory 322.

The communications unit 302 may include one or more wired and/or wireless input/output (I/O) interfaces 309 that are configurable to communicate with other communication devices, such as others of the edge devices 101 and/or the dispatch computing device 158 and/or the analytical computing device 162.

For example, the communications unit 302 may include one or more wireless transceivers 308, such as a digital mobile radio (DMR) transceiver, a Project 25 (P25) transceiver, a Bluetooth transceiver, a Wi-Fi transceiver, for example operating in accordance with an IEEE 802.11 standard (e.g., 802.11a, 802.11b, 802.11g), an LTE transceiver, a Worldwide Interoperability for Microwave Access (WiMAX) transceiver, for example operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some embodiments, the controller 320 and/or the edge device 301 is not a generic controller and/or a generic device, but a device specifically configured to implement functionality for searching for a candidate subject in multimedia data received at the edge device 301, for example at the imaging device 332 and/or the microphone 333. For example, in some embodiments, the edge device 301 and/or the controller 320 specifically comprises a computer executable engine configured to implement specific functionality for searching for a candidate subject in multimedia data received at the edge device 301.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the edge device 301 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for searching for a candidate subject in multimedia datareceived at the edge device 301, for example at the imaging device 332. In illustrated examples, when the controller 320 executes the application 323, the controller 320 is enabled to: receive a classifier of a candidate subject; and search for the candidate subject in multimedia data received at the imaging device 332 using the classifier and the object recognition engine. Alternatively, in illustrated examples, when the controller 320 executed the application 32, and a candidate subject is identified in multimedia data received at the imaging device 332, the controller 320 may generate an alert which is transmitted to other communication devices in the system 100, and/or control the display screen 305 and/or the speaker 328 to provide the alert. Alternatively, in illustrated examples, when the controller 320 executes the application 323, the controller 320 is enabled to: receive an alert from another communication device identifying the candidate subject and control the display screen 305 and/or the speaker 328 to provide the alert.

The classifier and/or the alert may be received from the analytical computing device 162, which is described hereafter.

Figure 4:
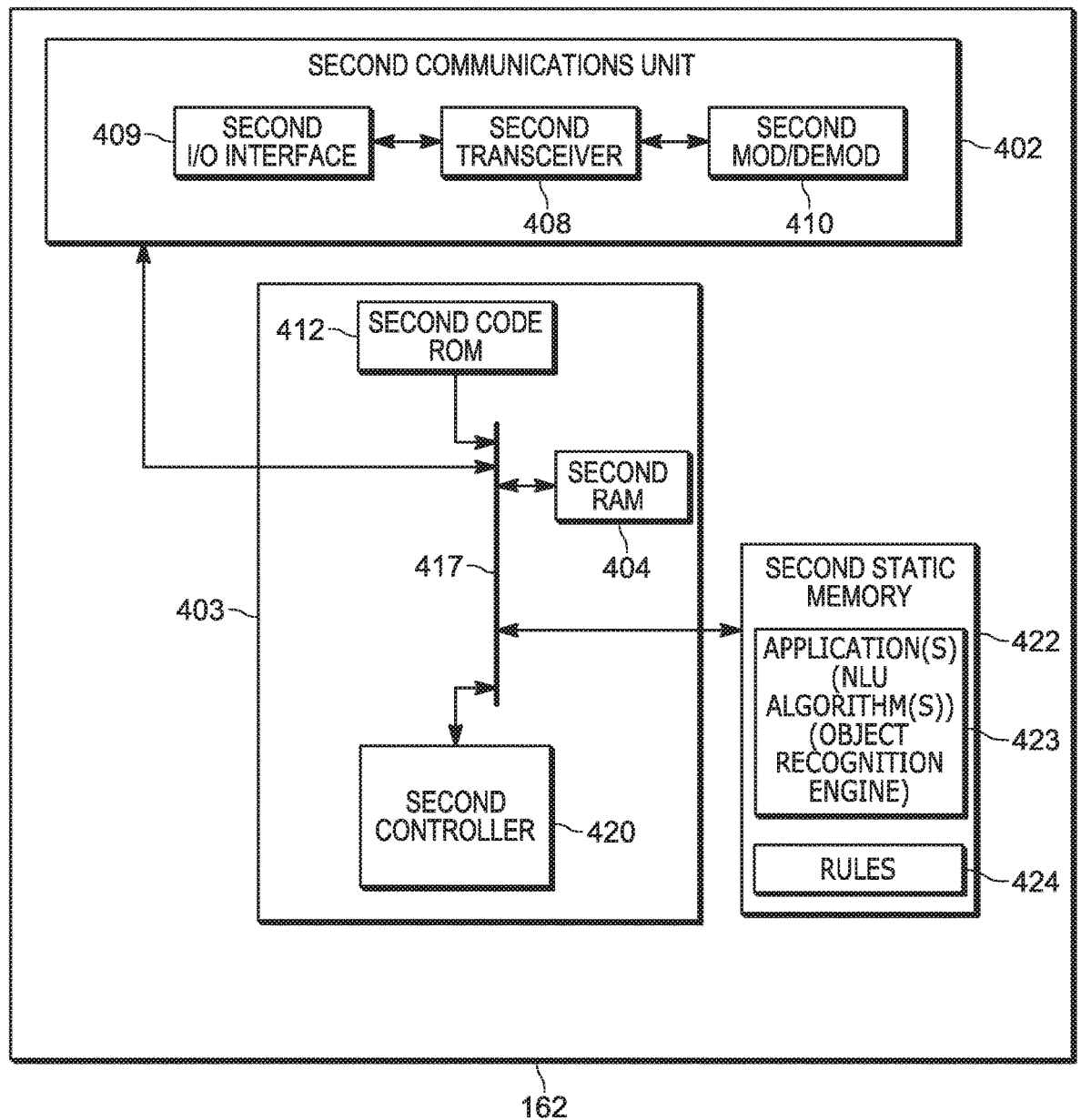
FIG. 4 is a device diagram showing a device structure of an analytical computing device for generating an alert and an automatic search for a candidate subject in accordance with some embodiments.

Attention is next directed to FIG. 4 which depicts which sets forth a schematic diagram that illustrates the analytical computing device 162. The configuration of the analytical computing device 162 is generally similar to the configuration of the example edge device 301, but adapted for functionality of a cloud computing device and/or a server device. Hence, as depicted in FIG. 4, the analytical computing device 162 generally includes a second communications unit 402, a second processing unit 403, a second Random Access Memory (RAM) 404, one or more second wireless transceivers 408, one or more second wired and/or wireless input/output (I/O) interfaces 409, a second combined modulator/demodulator 410, a second code Read Only Memory (ROM) 412, a second common data and address bus 417, a second controller 420, and a second static memory 422 storing one or more applications 423 (which may include one or more natural language understanding algorithms and an object recognition engine) and rules 424 for rating candidate subjects. The one or more applications 423 will be interchangeably referred to hereafter as the application 423, though different applications 423 may be used for different modes of the device 400. The analytical computing device 162 is described hereafter in further detail.

As shown in FIG. 4, the analytical computing device 162 includes the communications unit 402 coupled to the common data and address bus 417 of the processing unit 403. While not depicted, the analytical computing device 162 may also include one or more input devices (e.g., keypad, pointing device, touch-sensitive surface, etc.) and a display screen (which, in some embodiments, may be a touch screen and thus also act as an input device), each coupled to be in communication with the processing unit 403. The analytical computing device 162 may also include one or more of speaker and a microphone used for interactions with the analytical computing device 162.

The processing unit 403 may include the code Read Only Memory (ROM) 412 coupled to the common data and address bus 417 for storing data for initializing system components. The processing unit 403 may further include the controller 420 coupled, by the common data and address bus 417, to the Random Access Memory (RAM) 404 and a static memory 422.

The communications unit 402 may include one or more wired and/or wireless input/output (I/O) interfaces 409 that are configurable to communicate with other communication devices, such as the edge devices 101.

For example, the communications unit 402 may include one or more wireless transceivers 408, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 402 may additionally or alternatively include one or more wireline transceivers 408, such as an Ethernet transceiver, a USB transceiver, or similar transceiver configurable to communicate via a twisted pair wire, a coaxial cable, a fiber-optic link, or a similar physical connection to a wireline network. The transceiver 408 is also coupled to a combined modulator/demodulator 410.

The controller 420 may include ports (e.g. hardware ports) for coupling to other hardware components (e.g. a display screen, an input device, a speaker and/or a microphone, and the like).

The controller 420 includes one or more logic circuits, one or more processors, one or more microprocessors, one or more ASIC (application-specific integrated circuits) and one or more FPGA (field-programmable gate arrays), and/or another electronic device. In some embodiments, the controller 420 and/or the analytical computing device 162 is not a generic controller and/or a generic device, but a device specifically configured to implement functionality for generating an alert and an automatic search for a candidate subject. For example, in some embodiments, the analytical computing device 162 and/or the controller 420 specifically comprises a computer executable engine configured to implement specific functionality for generating an alert and an automatic search for a candidate subject.

The static memory 422 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 4, programming instructions (e.g., machine readable instructions) that implement the functional teachings of the analytical computing device 162 as described herein are maintained, persistently, at the memory 422 and used by the controller 420 which makes appropriate utilization of volatile storage during the execution of such programming instructions.

In particular, the memory 422 stores instructions corresponding to the application 423 that, when executed by the controller 420, enables the controller 420 to implement functionality for generating an alert and an automatic search for a candidate subject. In illustrated examples, when the controller 420 executes the application 423, the controller 420 is enabled to: monitor, via the communication unit 402, one or more data sources to identify a candidate subject; determine, from the rules 424, a rating of the candidate subject; when the rating meets a first threshold: transmit, via the communication unit 402, to one or more communication devices (e.g. the edge devices 101 and/or the dispatch computing device 158), an alert identifying the candidate subject; and when the rating meets a second threshold, lower than the first threshold: provide a classifier defining the candidate subject to an object recognition engine to cause the object recognition engine to automatically search for the candidate subject, using the classifier, in multimedia data received at one or more edge devices 101. Such multimedia data may include, but is not limited to images received at the one or more edge devices 101 and/or audio received at the one or more edge devices 101. In some embodiments, the controller 220 generates the classifier based on descriptors for the candidate subject, while in other embodiments, the classifier may be retrieved from the one or more databases 163, for example based on descriptors for the candidate subject.

As depicted, the application 423 includes one or more natural language understanding (NLU) algorithms which may be used to identify candidate subjects from the data sources 170. For example, with reference to FIG. 1, the communications 181, 182 each include descriptors that respectively identify subjects 191, 192. The one or more natural language understanding (NLU) algorithms may be used by the controller 420 to identify the candidate subjects and extract the descriptors from the communications 181, 182, and may be further used by the controller 420 to determine and/or extract context data from the communications 181, 182, the context data defining a context of the subjects 191, 192. The context data may define an incident type, and the like, associated with a subject 191, 192; for example, the subject 191 may be associated with lost child and/or an amber alert, while the subject 192 may be associated with a crime, such as a mugging, and the like. Indeed, in some embodiments, the incident type may be used to one or more of: select which of the rules 424 to use to rate a candidate subject identified from the data sources 170; and/or be used as input to the rules 424. The one or more natural language understanding algorithms may be embodied in one or more of the machine learning algorithms described above.

In some embodiments, the candidate subject may be specifically identified in the databases 163, for example as being a particular person (e.g. the name and identity of the candidate subject may be identified). For example, while not depicted, the communications 181, 182 may include a name of the candidate subject, which may be used to specifically identify the candidate subject in the databases 163.

Alternatively, in some embodiments, the communications 181, 182 may include an image of a respective candidate subject (e.g. the subjects 191, 192) and the candidate subjects may be identified by the analytical computing device 162 from the databases 163 using facial recognition techniques (e.g. using an object recognition engine of the application 423), assuming that images of the respective candidate subject are also stored in the databases 163.

However, in other embodiments, the candidate subject may be only generically identified, for example via a physical description only defined by the descriptors in the communications 181, 182.

The rules 424 are generally used to rate a candidate subject identified from the data sources 170. For example, the controller 420 may identify a candidate subject and then use the rules 424 to rate the candidate subject using descriptors in the communications 181, 182 and/or data from the databases 163 as described in more detail below.

Furthermore, an incident type derived from the descriptors, as described above, may be used to one or more of: select which of the rules 424 to use to rate a candidate subject identified from the data sources 170; and/or be used as input to the rules 424. For example, when an incident type is an amber alert, specific rules 424 associated with amber alerts may be used to rate the candidate subject; and/or the incident type may be used as input to the rules 424. Such incident types may include, but are not limited to, amber alerts, missing persons, crimes, violent crimes, a candidate subject being a suspect in a crime, and the like.

As depicted, the application 423 further includes an object recognition engine similar to the object recognition engine of the application 323. Hence, in some embodiments, functionality of searching for a candidate subject using classifiers described with respect to the edge device 301 may occur at the analytical computing device 162; for example, when the edge devices 101 stream multimedia data and/or images and/or video and/or audio to the analytical computing device 162, the analytical computing device 162 may generate the classifiers of the candidate subjects and search for the candidate subjects in the streamed images and/or video and/or audio.

However, in example embodiments described herein, the analytical computing device 162 generally generates classifiers which are transmitted to the edge devices 101, where respective object recognition engines (e.g. of the application 323) search for candidate subjects in multimedia data received using the imaging devices 102.

Furthermore, in some embodiments, object recognition engines at a combination of the edge devices 101 and the analytical computing device 162 may be used to identify candidate subjects.

Similarly, while present embodiments are described with respect to the analytical computing device 162 identifying candidate subjects, as well as rating the candidate subjects etc., such functionality may be at least partially performed by one or more of the edge devices 101, the infrastructure controller 156, the dispatch computing device 158, the analytical computing device 162, the media access computing device 169 and/or a combination thereof. In other words, the functionality of the system 100 may be distributed among a plurality of devices of the system 100.

Indeed, such functionality may also be at least partially embodied in the form of an electronic digital assistant, which may be located at one or more of (and/or distributed between one or more of) the edges devices 101, the infrastructure controller 156, the analytical computing device 162 and a combination thereof.

Figure 5:
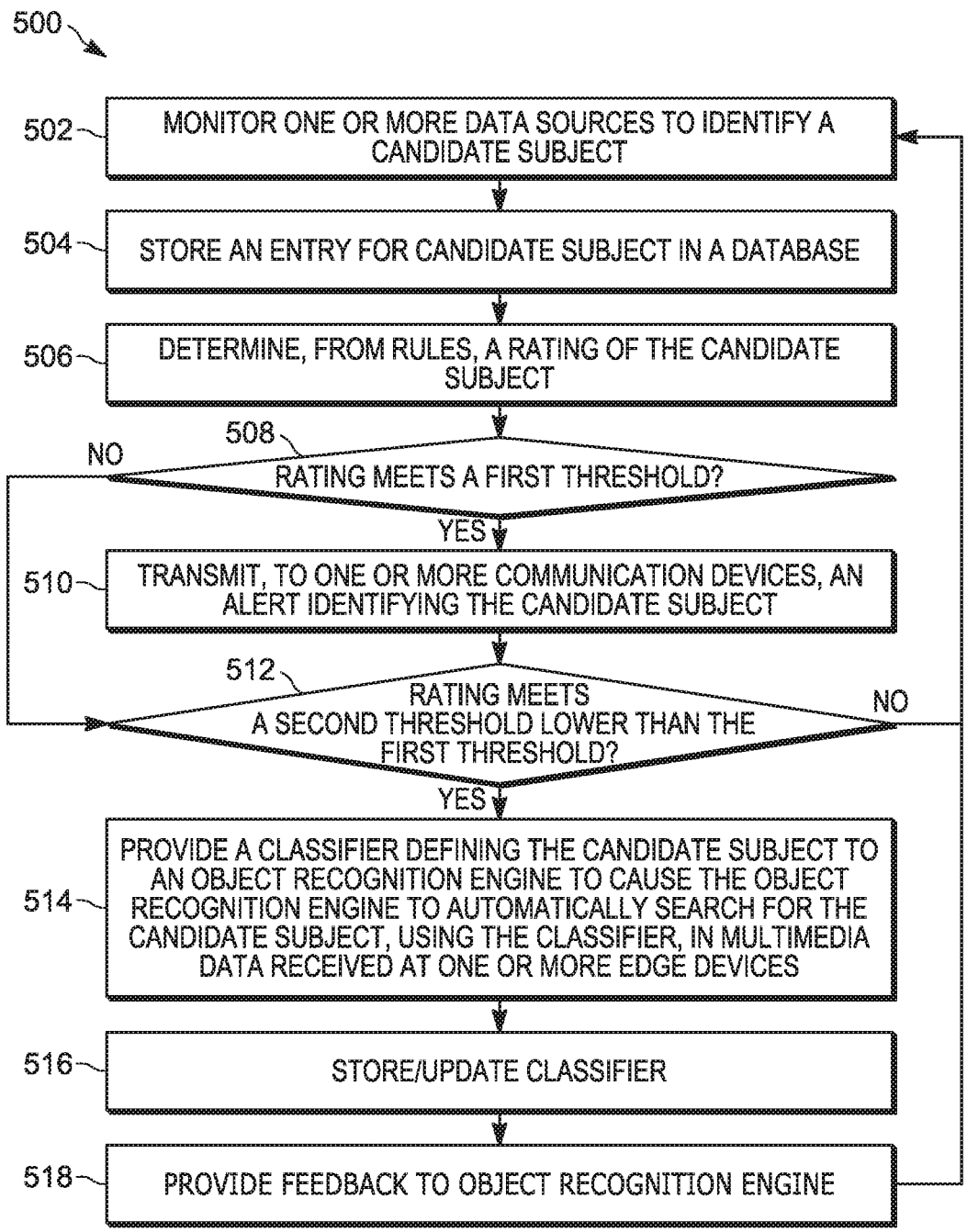
FIG. 5 is a flowchart of a method for generating an alert and an automatic search for a candidate subject in accordance in accordance with some embodiments.

Attention is now directed to FIG. 5 which depicts a flowchart representative of a method 500 for generating an alert and an automatic search for a candidate subject. The operations of the method 500 of FIG. 5 correspond to machine readable instructions that are executed by, for example, the analytical computing device 162, and specifically by the controller 420 of the analytical computing device 162. In the illustrated example, the instructions represented by the blocks of FIG. 5 are stored at the memory 422 for example, as the application 423. The method 500 of FIG. 5 is one way in which the controller 420 and/or the analytical computing device 162 and/or the system 100 is configured. Furthermore, the following discussion of the method 500 of FIG. 5 will lead to a further understanding of the system 100, and its various components. However, it is to be understood that the method 500 and/or the system 100 may be varied, and need not work exactly as discussed herein in conjunction with each other, and that such variations are within the scope of present embodiments.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

Furthermore, while it is understood by a person of skill in the art hereafter that the method 500 is performed at the analytical computing device 162, the method 500 may be performed at one or more of the devices of the system 100, for example at a combination of one or more of at least one of the edge devices 101, the infrastructure controller 156, the dispatch computing device 158, the analytical computing device 162, the media access computing device 169, etc.

At a block 502, the analytical computing device 162 monitors, via the communication unit 402, the one or more data sources 170 to identify a candidate subject. For example, the analytical computing device 162 may process the communications 181, 182 to identify a candidate subject.

At an optional block 504, the analytical computing device 162 stores an entry for the candidate subject in a database, such as one or more of the databases 163. The block 504 may occur when an entry for the candidate subject does not already exist in one or more of the databases 163. Alternatively, when the candidate subject already exists in one or more of the databases 163, the entry may be updated based on the communications 181, 182 for example.

At a block 504, the analytical computing device 162 determines, from the rules 424, a rating of the candidate subject. The rating may comprise a numerical rating of importance, for example, on a scale of 0 to 100, where 0 indicates a lowest level of importance, and 100 indicates a highest level of importance. However, other scales, and/or other ratings processes, are within the scope of the present specification.

The rating may be determined in conjunction with entries in the databases 163 associated with the candidate subject and/or the rating may be determined from descriptors in the communications 181, 182 of the one or more data sources 170. Furthermore, the descriptors of a candidate subject may be used to search the one or more databases 163 for data used as input to the rules 424; such input available from the one or more databases 163 may include, but is not limited to: a criminal history of a candidate subject, known associates of a candidate subject, friends and/or family of a candidate subject, and the like. Furthermore, the one or more natural language algorithms may be used to determine whether communications are said as warnings, in jest, and/or any other suitable type of category of communications. Indeed, data from the one or more natural language algorithms and/or data derived from the or more databases 163 may be used as input to the rules 424. The rules 424 may be based on one or more of the following factors:

A severity of suspected crimes associated with the candidate subject (e.g. identified from the descriptors of the communications 181, 182 and/or the databases 163). For example, one or more of the rules 424 may cause the rating to decrease when a suspected crime is a non-violent crime such as jaywalking, and increase the rating when the suspected crime is a violent crime such as a mugging. In other words, an incident type, as identified from the descriptors, may be used as input for the rules 424 and/or to select rules 424 associated with the incident type. For example, rules 424 associated with a non-violent crime may be different from rules 424 associated with a violent crime, which in turn may be different from rules 424 associated with amber alerts and/or missing persons.

A criminal history of the candidate subject (e.g. identified the databases 163). For example, one or more of the rules 424 may cause the rating to decrease when the criminal history includes only non-violent crimes such as jaywalking, and increase the rating when the criminal history includes a violent crime such as a mugging.

A personal context of the candidate subject (e.g. identified from the descriptors of the communications 181, 182 and/or the databases 163). For example, one or more of the rules 424 may cause the rating to increase when a missing person is child. Similarly, one or more of the rules 424 may cause the rating to decrease when the candidate subject is described in the communications 181, 182 as being an acquaintance, friend and/or co-worker, for example being joked about (e.g. as identified from descriptors in the communications 181, 182). In other words, such personal contexts may include descriptions of candidate subjects that are in jest.

Candidate subjects that are already found and/or in custody and/or already captured (e.g. as determined from the databases 163). For example, one or more of the rules 424 may cause the rating to decrease (e.g. to 0) when an identified candidate subject is determined to be already found and/or in custody and/or already captured.

Candidate subjects that are deceased or incarcerated (e.g. as determined from the databases 163). For example, one or more of the rules 424 may cause the rating to decrease (e.g. to 0) when an identified candidate subject is determined to be deceased or incarcerated.

Further information received after the candidate subject is identified. For example, the analytical computing device 162 may continue to monitor the data sources 170 and update an initial rating when further communications are received regarding the candidate subject, based on the above-mentioned factors.

Indeed, from the rules 424, some candidate subjects identified at the block 502 may be discarded and/or filtered out based on ratings and/or on context data associated with the candidate subject. For example, when a rating of a candidate subject is below a threshold value, for example "10" on a scale of 0-100, the method 500 may end and the candidate subject is neither searched nor is an alert generated therefore.

However, one or more of the rules 424 may cause the method 500 to end based on the context data associated with the candidate subject, prior to a rating being determined. For example, in an alternative implementation of the block 506, context data associated with a candidate subject may indicate that the candidate subject is deceased, incarcerated and the like, and the method 500 may then end without a rating being determined. In these embodiments, the candidate subject may be discarded and/or filtered out based on context data.

However, assuming that a rating has been determined at the block 506, at a block 508, the analytical computing device 162 determines whether the rating meets a first threshold. For example, the rating determined at the block 506 may be compared to a first threshold rating value. Such a first threshold rating value may be associated with a "high" importance candidate subject, such as a missing child and the like, and the first threshold rating value selected accordingly. For example, the first threshold rating value may be "80" based on a rating scale of 0-100, with the first threshold rating value of "80" selected assuming that all missing children will result in a rating of 80 or higher; the first threshold value may be adjusted accordingly.

When the rating determined at the block 506 meets the first threshold (e.g. a 'YES' decision at the block 508), at a block 510, transmits, via the communication unit 402, to one or more communication devices (e.g. the edge devices 101 and/or the dispatch computing device 158), an alert identifying the candidate subject. For example, the alert can include text and/or images of the candidate subject, the text and/or images automatically extracted from the communications 181, 182 and/or arranged to be in the form of an electronic alert.

Following the block 510 and/or, when the rating determined at the block 506 does not meet the first threshold (e.g. a 'NO' decision at the block 508), at a block 512, the analytical computing device 162 determines whether the rating meets a second threshold lower than the first threshold. Such a second threshold rating value may be associated with a "medium" importance candidate subject, such as a suspect in a crime and the like, and the second threshold rating value selected accordingly. For example, the first threshold rating value may be "80" based on a rating scale of 0-100, with the second threshold rating value of "50" selected assuming that all suspects in crimes will result in a rating of 50 or higher; the second threshold value may be adjusted accordingly.

Furthermore, while the rating and the first threshold and second threshold are described with respect to specific numerical scales and values, any types of ratings and thresholds are within the scope of present embodiments, including, but not limited to, descriptive ratings and/or threshold conditions that are not numeric.

When the rating determined at the block 506 does not meet the second threshold (e.g. a 'NO' decision at the block 512, for example the rating may below 50), the analytical computing device 162, continues to monitor the data sources 170 at the block 502. While in these embodiments no electronic alert for the candidate subject is issued nor does any automatic searching for the candidate subject occur, a verbal alert (such as a verbal APB or verbal BOLO) may still occur (e.g. verbally transmitted by dispatchers at the dispatch computing device 158 to the edge devices 101) and/or any data collected on the candidate subjects may still be saved in the databases 163.

However, when the rating determined at the block 506 meets the second threshold (e.g. a 'YES' decision at the block 512, for example the rating may be between 50 and 80), at a block 514, the analytical computing device 162, provides a classifier defining the candidate subject to an object recognition engine to cause the object recognition engine to automatically search for the candidate subject, using the classifier, in multimedia data received at one or more edge devices 101. The multimedia data may include, but is not limited to, images. In other words, the block 514 may include the analytical computing device providing a classifier defining the candidate subject to an object recognition engine to cause the object recognition engine to automatically search for the candidate subject, using the classifier, in images received at one or more edge devices 101.

In some embodiments, where the candidate subject has been identified in the databases 163 and a classifier for the candidate subject has been previously stored, the analytical computing device 162 retrieves the classifier from the databases 163.

However, the analytical computing device 162 may generate the classifier using descriptors of the candidate subject extracted from data (e.g. from the communications 181, 182) received from the one or more data sources 170.

In some embodiments, the analytical computing device 162 transmits the classifier to the one or more edge devices 101 to cause each of the respective object recognition engines to search for the candidate subject, using the classifier, in respective multimedia data received at the one or more edge devices 101, including, but not limited to, images from the image devices 102 and/or audio data from the microphones 103.

However, in other embodiments, an object recognition engine may be located at a cloud device (e.g. including, but not limited to, the analytical computing device 162) in communication with the one or more edge devices 101, and the analytical computing device 162 may be further configured to provide the classifier to the object recognition engine at the cloud device to cause the object recognition engine to search for the candidate subject, using the classifier, in respective multimedia data received at the cloud device from the one or more edge devices 101. In such embodiments the edge devices 101 are providing multimedia data, including, but not limited to, images received from the respective imaging devices 102 and/or audio data received from the respective microphones 103, to the cloud device (e.g. the analytical computing device 162), for example in a streaming configuration.

At an optional block 516, the analytical computing device 162 may store and/or update the classifier at the databases 163. For example, when the candidate subject has been identified in the databases 163 and the classifier for the candidate subject has been previously stored, the analytical computing device 162 may update the classifier using descriptors of the candidate subject extracted from data received from the one or more data sources 170. Alternatively, when the candidate subject has not been identified in the databases 163 and/or a classifier for the candidate subject has not been previously stored, the classifier is stored in the databases 163.

At an optional block 518, the analytical computing device 162 may provide feedback to the object recognition engine (and/or object recognition engines) to which the classifier was provided, the feedback indicating whether or not the candidate subject was identified using the classifier. Such feedback may be in the form of an incident report, and the like, and may be used by machine learning algorithms at the object recognition engine (and/or object recognition engines) to "teach" the machine learning algorithms to better identify candidate subjects.

Example embodiments of the method 500 are next described with reference to FIG. 6 to FIG. 20, each of which are substantially similar to FIG. 1 with like elements having like numbers.

Figure 6:
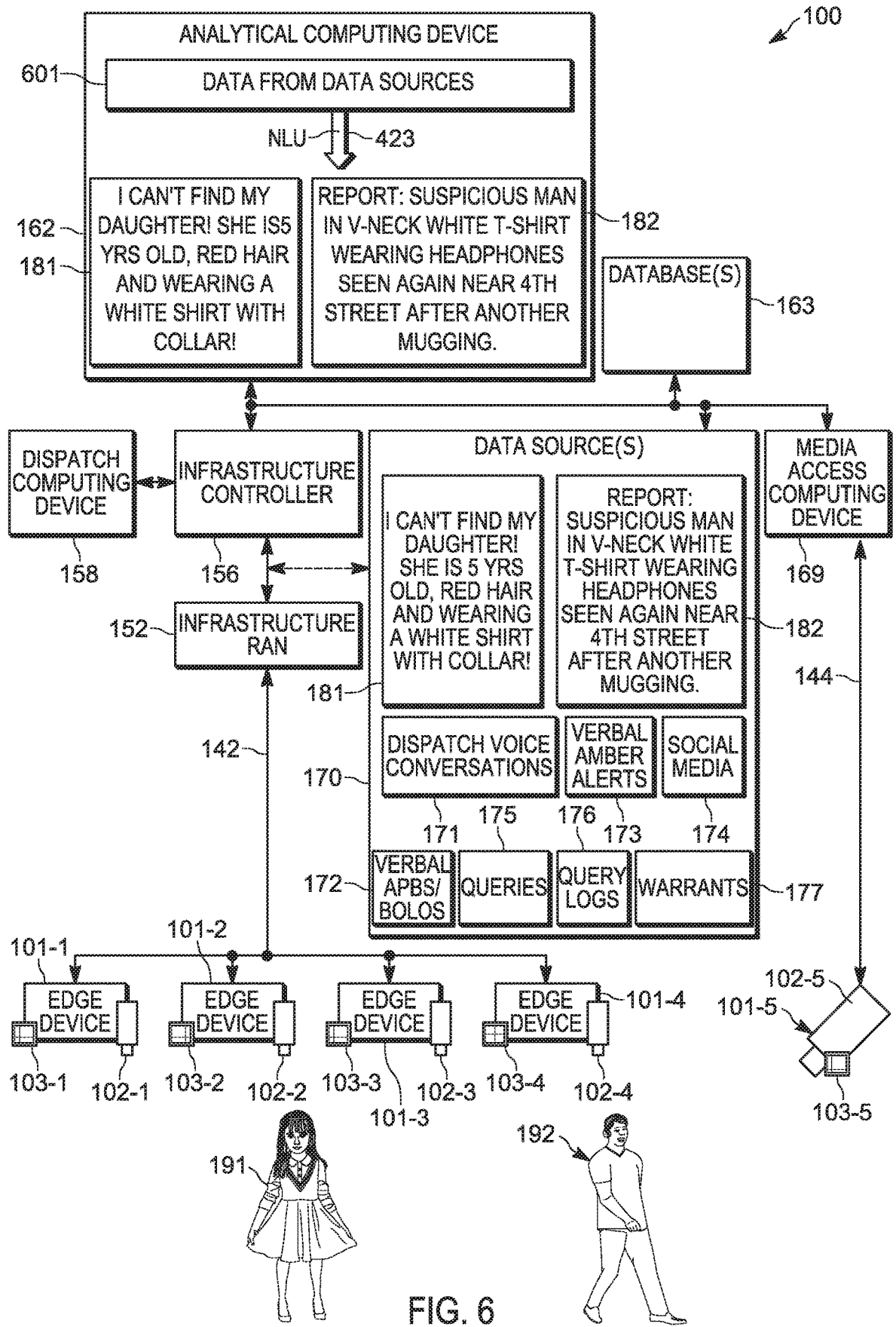
FIG. 6 depicts the analytical computing device identifying candidate subjects in data from data source in accordance with some embodiments.
Figure 7:
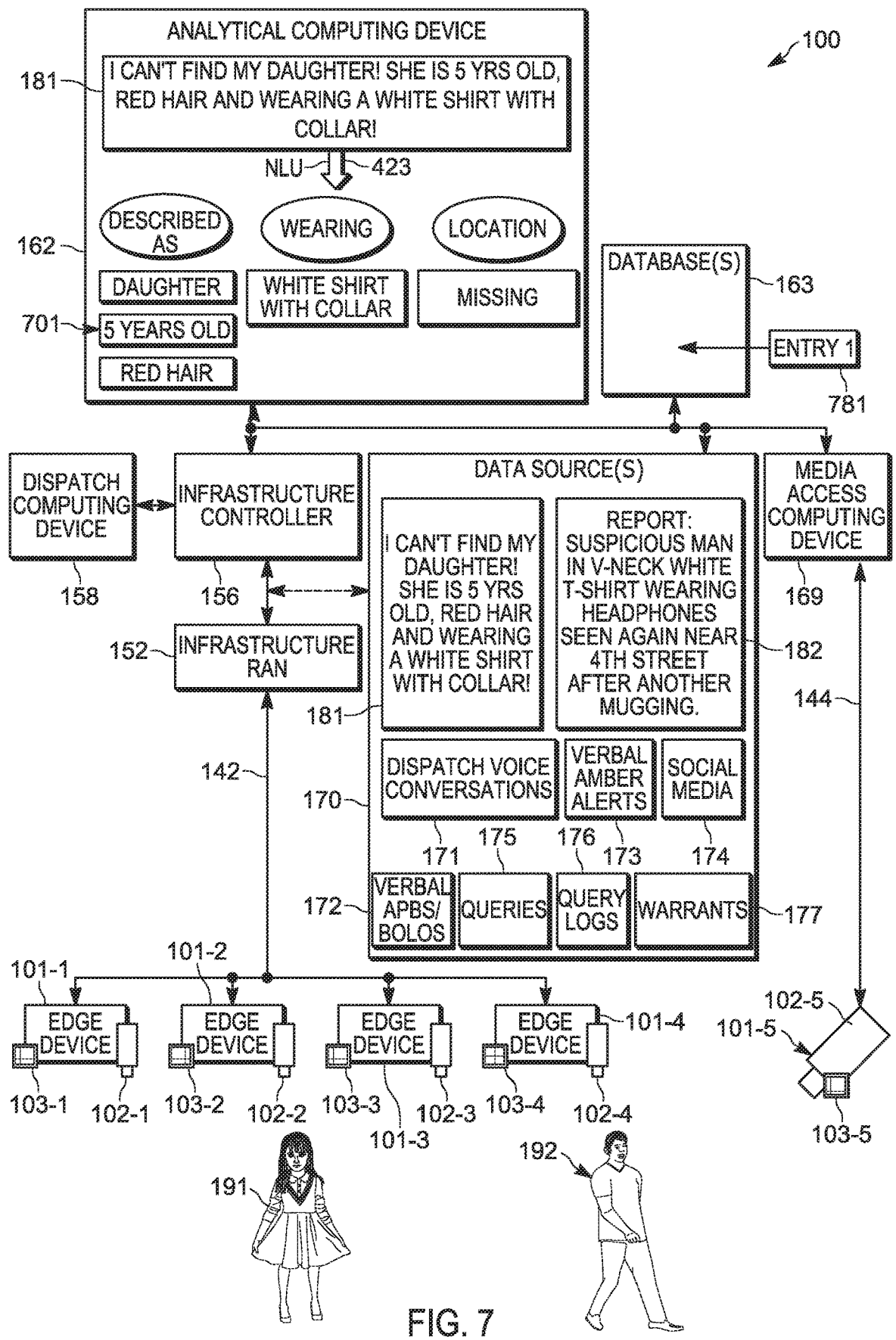
FIG. 7 depicts the analytical computing device generating descriptors of a first candidate subject in accordance with some embodiments.
Figure 8:
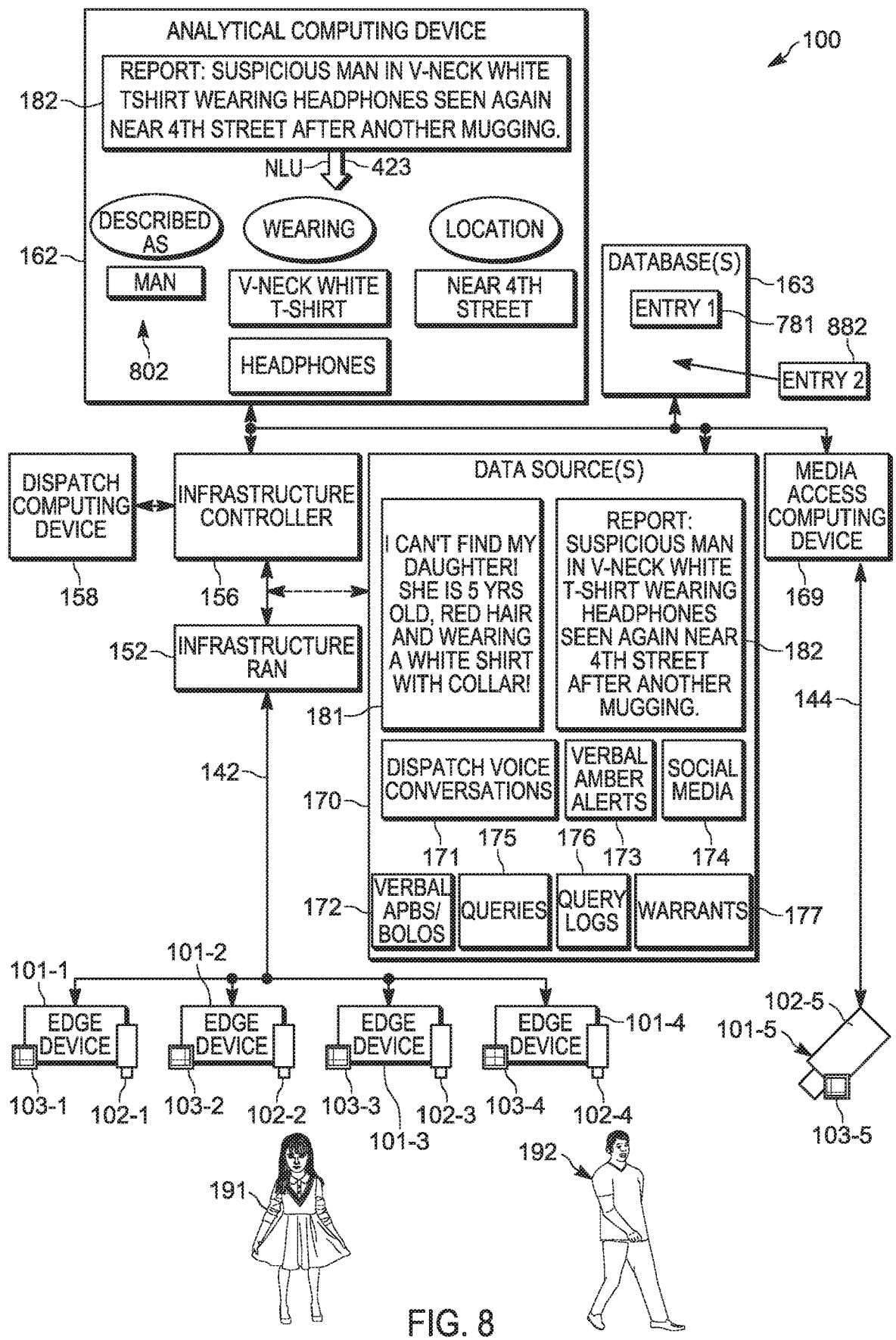
FIG. 8 depicts the analytical computing device generating descriptors of a second candidate subject in accordance with some embodiments.

Attention is next directed to FIG. 6, FIG. 7 and FIG. 8 which depict an example embodiment of the block 502 of the method 500, in which the analytical computing device 162 monitors communications from the data sources (e.g. the dispatch voice conversations 171, the verbal APBs and/or BOLOs 172, the verbal amber alerts 173, the social media 174 communications, the live queries 175 to the databases, the logs 176 of queries to the databases, the warrants 177, etc.) and uses one or more natural language understanding algorithms of the application 423 to identify communications 181, 182 which are associated with candidate subjects. The natural language understanding algorithms of the application 423 may be "trained" to search for candidate subjects based on descriptors in the data 601.

For example, the communication 181 includes the words "missing" and "daughter" which may indicate a missing child, and the communication 182 includes the words "mugging" and "suspicious man" which may indicate a suspect in a crime.

As depicted in FIG. 7, the one or more natural language understanding algorithms of the application 423 may also be used to extract descriptors 701 (e.g. descriptors) of a candidate subject associated with the communication 181. For example, as depicted, the descriptors 701 include words "daughter", "5 years old" and "red hair" which describe physical attributes of the candidate subject. Similarly, the descriptors 701 include words "white shirt with collar" which describe what the candidate subject is wearing. Similarly, the descriptors 701 includes the word "missing" which describes a location of the candidate subject, and specifically that the location of the candidate subject is unknown.

Also depicted in FIG. 7 is an example embodiment of the block 504 of the method 500 in which an entry 781 for the candidate subject associated with the communication 181 is provided to the databases 163 for storage and/or to search for the candidate subject in the databases 163. The entry 781 may include the descriptors 701 and may alternatively be described as a query to the databases 163 (e.g. to search for the candidate subject associated with the communication 181).

Similarly, with reference to FIG. 8, the one or more natural language understanding algorithms of the application 423 may also be used to extract descriptors 802 (e.g. descriptors) of a candidate subject associated with the communication 182. For example, as depicted, the descriptors 802 includes the word "man", which describes a physical attribute of the candidate subject. Similarly, the descriptors 802 include words "V-neck white t-shirt" and "headphones" which describe what the candidate subject is wearing. Similarly, the descriptors 802 includes the word "near 4th street" which describes a location of the candidate subject and which may also be described as geographic data associated with the candidate subject.

Also depicted in FIG. 8 is an example embodiment of the block 504 of the method 500 in which an entry 882 for the candidate subject associated with the communication 182 is provided to the databases 163 for storage and/or to search for the candidate subject in the databases 163. The entry 882 may include the descriptors 802 and may alternatively be described as a query to the databases 163 (e.g. to search for the candidate subject associated with the communication 182).

Figure 9:
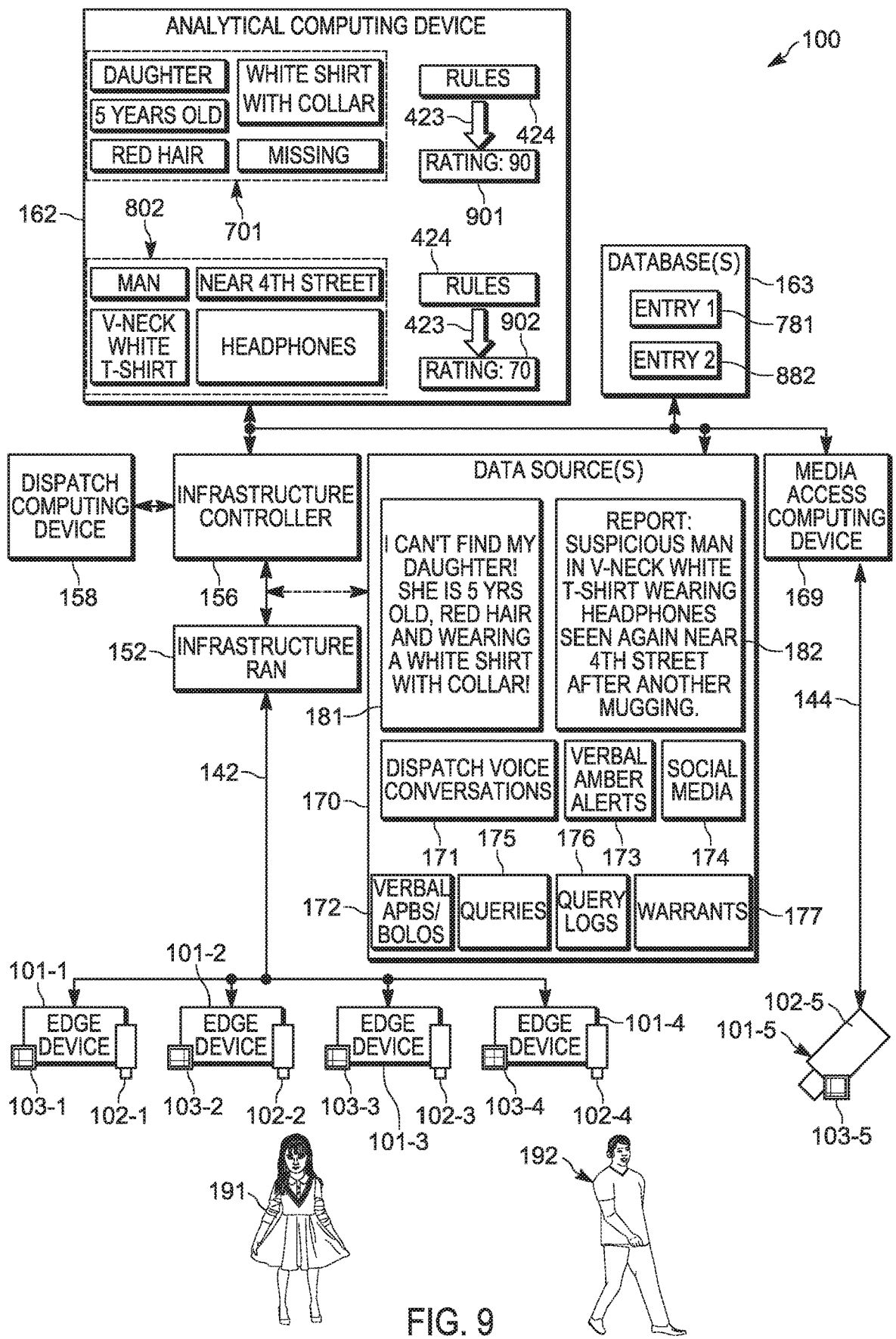
FIG. 9 depicts the analytical computing device determining a rating of each of the candidate subjects in accordance with some embodiments.

Attention is next directed to FIG. 9 which depicts an example embodiment of the block 506 of the method 500, in which the analytical computing device 162 determines, from the rules 424 (e.g. as applied via the application 423), respective ratings 901, 902 of each of the candidate subjects associated with the communications 181, 182, for example from the descriptors 701, 802 and/or using any data from the databases 163 associated with the candidate subjects, as described above.

As depicted, the rating 901 of the candidate subject associated with the communication 181 (and/or the descriptors 701) is "90", and the rating 902 of the candidate subject associated with the communications 182 (and/or the descriptors 802) is "70".

Figure 10:
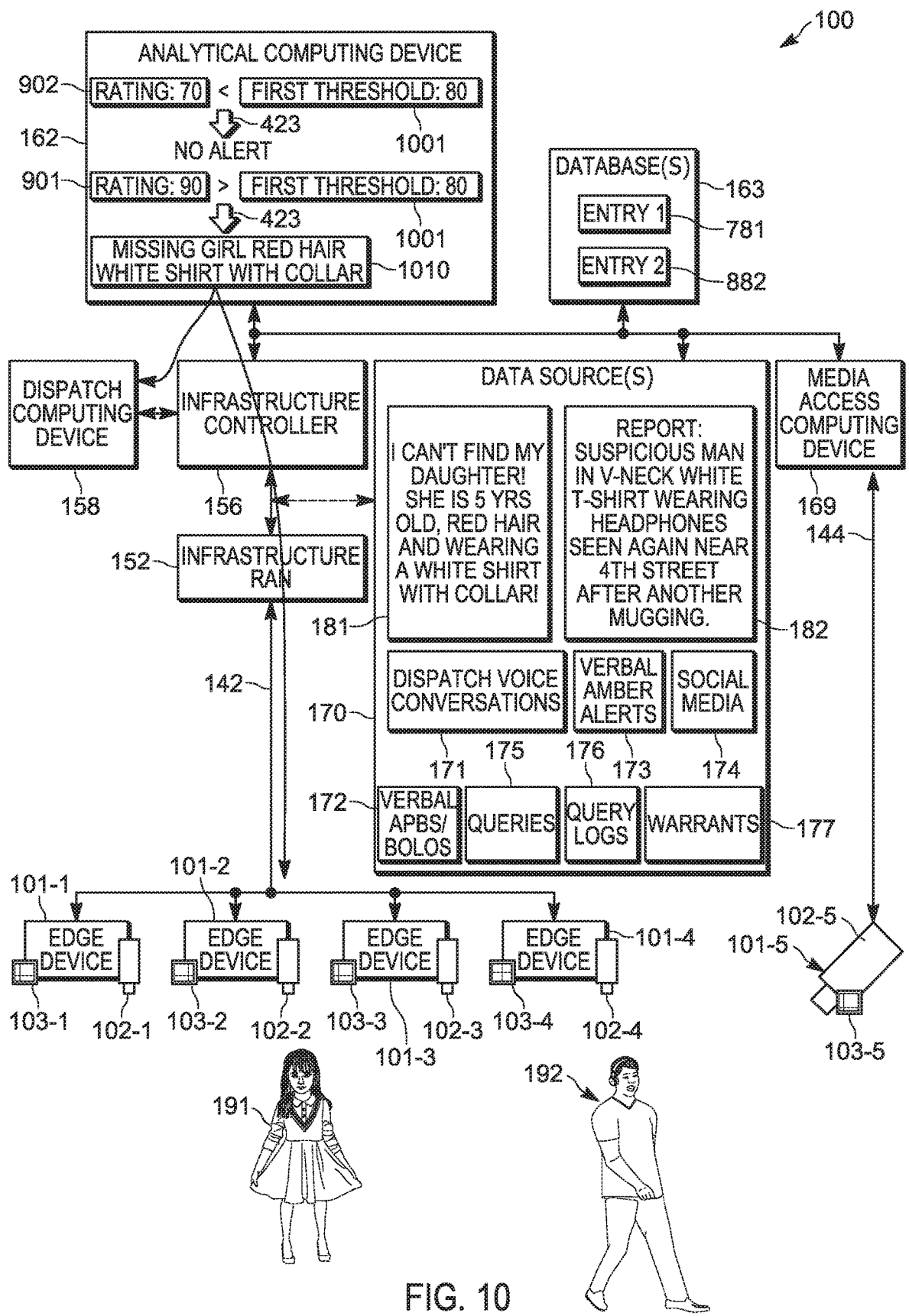
FIG. 10 depicts the analytical computing device comparing the rating of each of the candidate subject with a first threshold, and generating an alert for the first candidate subject as the respective rating meets the first threshold in accordance with some embodiments.

Attention is next directed to FIG. 10 which depicts an example embodiment of the block 508 and the block 510 of the method 500, in which the analytical computing device 162 compares (e.g. at the block 508 of the method 500) the ratings 901, 902 with a first threshold value 1001 of "80". As the rating 901 of "90" is greater than the first threshold value 1001 of "80" (e.g. a "YES" decision at the block 508 of the method 500), the analytical computing device 162 generates and transmits (e.g. at the block 510 of the method 500) an electronic alert 1010 to the dispatch computing device 158 and the mobile edge devices 101-1, 101-2, 101-3, 101-4. The analytical computing device 162 may alternatively transmit the electronic alert 1010 to the fixed edge device 101-5, though as there is no person associated with the fixed edge device 101-5, the analytical computing device 162 may alternatively refrain from transmitting electronic alert 1010 to the fixed edge device 101-5. The communication devices to which the alert 1010 is transmitted may be defined at the analytical computing device 162 based on further rules, as described in more detail below. The alert 1010 may comprise one or more of an electronic APB, an electronic BOLO and/or an electronic amber alert. However, the analytical device 162 and/or the device 200 and/or the controller 220 may be further configured to: when the rating 901 does not meet the first threshold 1001, refrain from generating the alert 1010 identifying the candidate subject.

As depicted, the electronic alert 1010 comprises descriptors from the communication 181, however arranged in the form of an alert; furthermore, familial and/or relative terms in the communication 181, such as "daughter" have been replaced with non-familial and/or non-relative terms, such as "girl". The alert 1010 may also include a name of the candidate subject associated with the communication 181 and/or an image of the candidate subject (e.g. when available, for example from the databases 163).

When received at an edge device 101 and/or the dispatch computing device 158, the alert 1010 may be rendered (e.g. via the edge device 101 implementing the application 323) at a respective display screen and/or converted to sound and "played" by a respective speaker and/or stored in conjunction with an incident management application and/or a command center application and the like.

In contrast to the rating 901, the rating 902 of "70" is less than the first threshold value 1001 of "80", and hence the analytical computing device 162 determines that "No Alert" is to be generated for the candidate subject associated with the communication 182 (e.g. a "NO" decision at the block 508 of the method 500). Hence, no alert is generated for the candidate subject associated with the communication 182.

Figure 11:
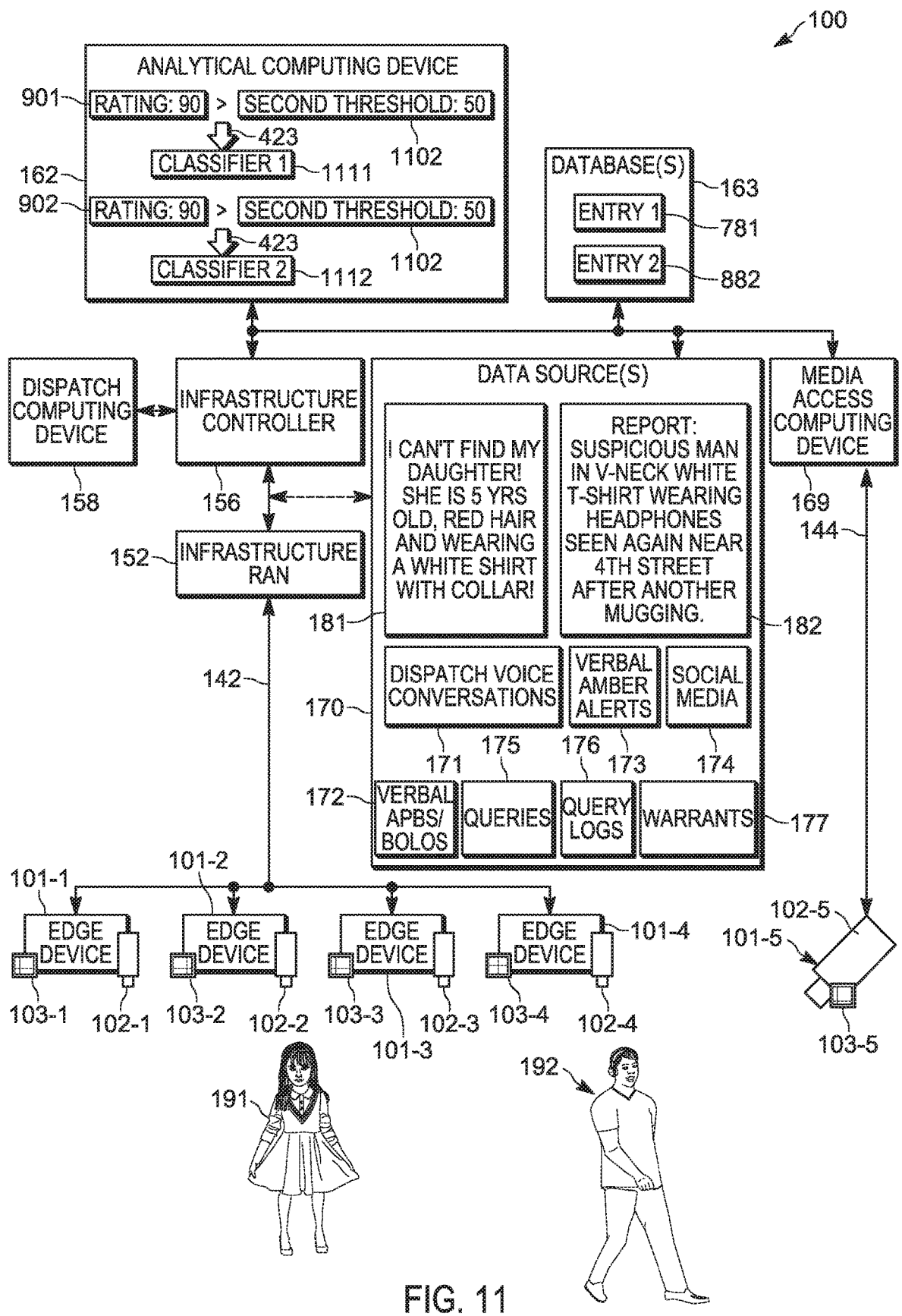
FIG. 11 depicts the analytical computing device comparing the rating of each of the candidate subjects with a second threshold, lower than the first threshold, and generating classifiers for each, as each rating meets the second threshold in accordance with some embodiments.
Figure 12:
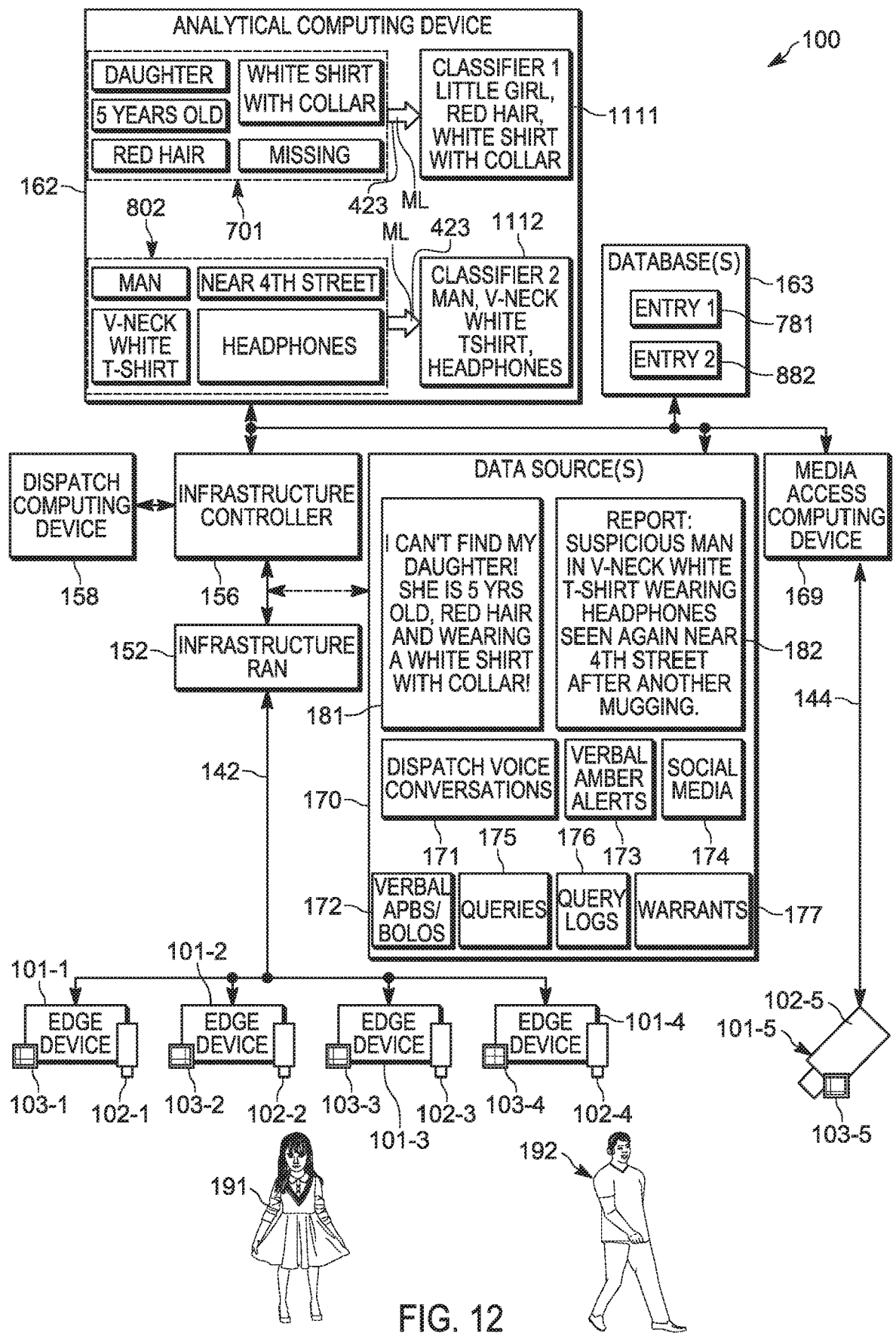
FIG. 12 depicts the analytical computing device generating the classifiers for each candidate subject in accordance with some embodiments.

Attention is next directed to FIG. 11 and FIG. 12 which depict an example embodiment of the block 512 of the method 500, in which the analytical computing device 162 compares (e.g. at the block 512 of the method 500) the ratings 901, 902 with a second threshold value 1102 of "50". As each the ratings 901, 902 of "90" and "70", respectively, are greater than the second threshold value 1102 of "50" (e.g. a "YES" decision at the block 512 of the method 500), the analytical computing device 162 generates respective classifiers 1111, 1112 of the candidate subjects respectively associated with the communications 181, 182.

As depicted in FIG. 12, the analytical computing device 162 generates the classifiers 1111, 1112 from the respective descriptors 701, 802 using, for example, the machine learning (ML) algorithms of the application 423. As depicted, the classifier 1111 includes data that may be used by an object recognition engine to search for a subject that includes: a little girl and red hair and a white shirt with collar; similarly, the classifier 1112 includes data that may be used by an object recognition engine to search for a subject that includes: a man and a v-neck white t-shirt and headphones. While the data in each of the classifiers 1111, 1112 is represented as text, the data in each of the classifiers may be in any format suitable for an object recognition engine.

Figure 13:
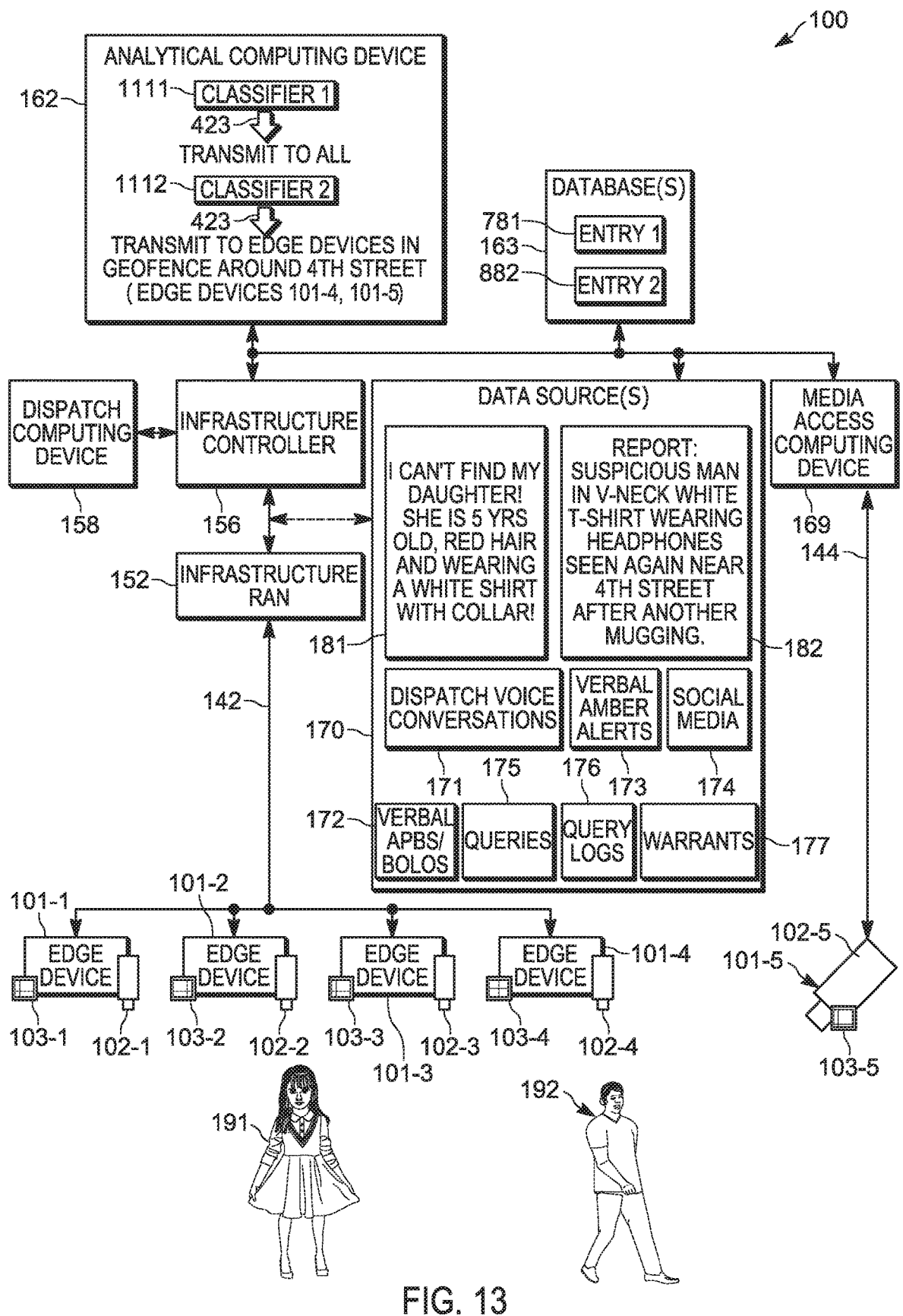
FIG. 13 depicts the analytical computing device determining the edge devices of which multimedia data is to be searched for the candidate subjects using the classifiers in accordance with some embodiments.

Attention is next directed to FIG. 13 which depicts an example embodiment of the block 514 of the method 500, in which the analytical computing device 162 provides the classifiers 1111, 1112 to respective object recognitions engines of the edge devices 101 by transmitting the classifiers 1111, 1112 to the one or more edge devices 101 to cause each of the respective object recognition engines to search (e.g. via the edge device 101 implementing the application 323) for the candidate subjects using the classifiers 1111, 1112, in respective multimedia data received at the one or more edge devices 101.

As depicted, the analytical computing device 162 may alternatively determine the one or more edge devices 101 to be used to search for a candidate subject using a geofence, and the like, the geofence generated from geographic data associated with the candidate subject received from the one or more data sources 170, the one or more edge devices 101 to which a is sent being inside the geofence.

For example, the communication 182 includes geographic data "near 4th street"; hence, assuming that the analytical computing device 162 has access to locations of the edge devices 101, the analytical computing device 162 may determine which edge devices 101 are "near" $4^{th}$ street, for example, by determining which geofences are within a given distance from $4^{th}$ street and/or within determined geographic boundaries of $4^{th}$ street. Any suitable process may be used to determine such geofences. Furthermore, the mobile edge devices 101-1, 101-2, 101-3, 101-4 may periodically report their locations to the analytical computing device 162 (and/or another device, such as the dispatch computing device 158 from which the analytical computing device 162 may retrieve the locations), such that the analytical computing device 162 may determine their locations relative to the geofence.

Furthermore, the analytical computing device 162 may have access to the locations of fixed edge devices 101, such as the fixed edge device 101-5, for example as stored in a database of such locations (which may be stored in the databases 163).

In FIG. 13, the analytical computing device 162 has determined that the edge devices 101-4, 101-5 are within a geofence around 4th street and has hence determined that the classifier 1112 is to be transmitted to the edge devices 101-4, 101-5.

However, as the communication 182 does not include geographic data, in FIG. 13, the analytical computing device 162 does not determine a geofence for the classifier 1111 and determines that the classifier 1111 is to be transmitted to all the edge devices 101.

Figure 14:
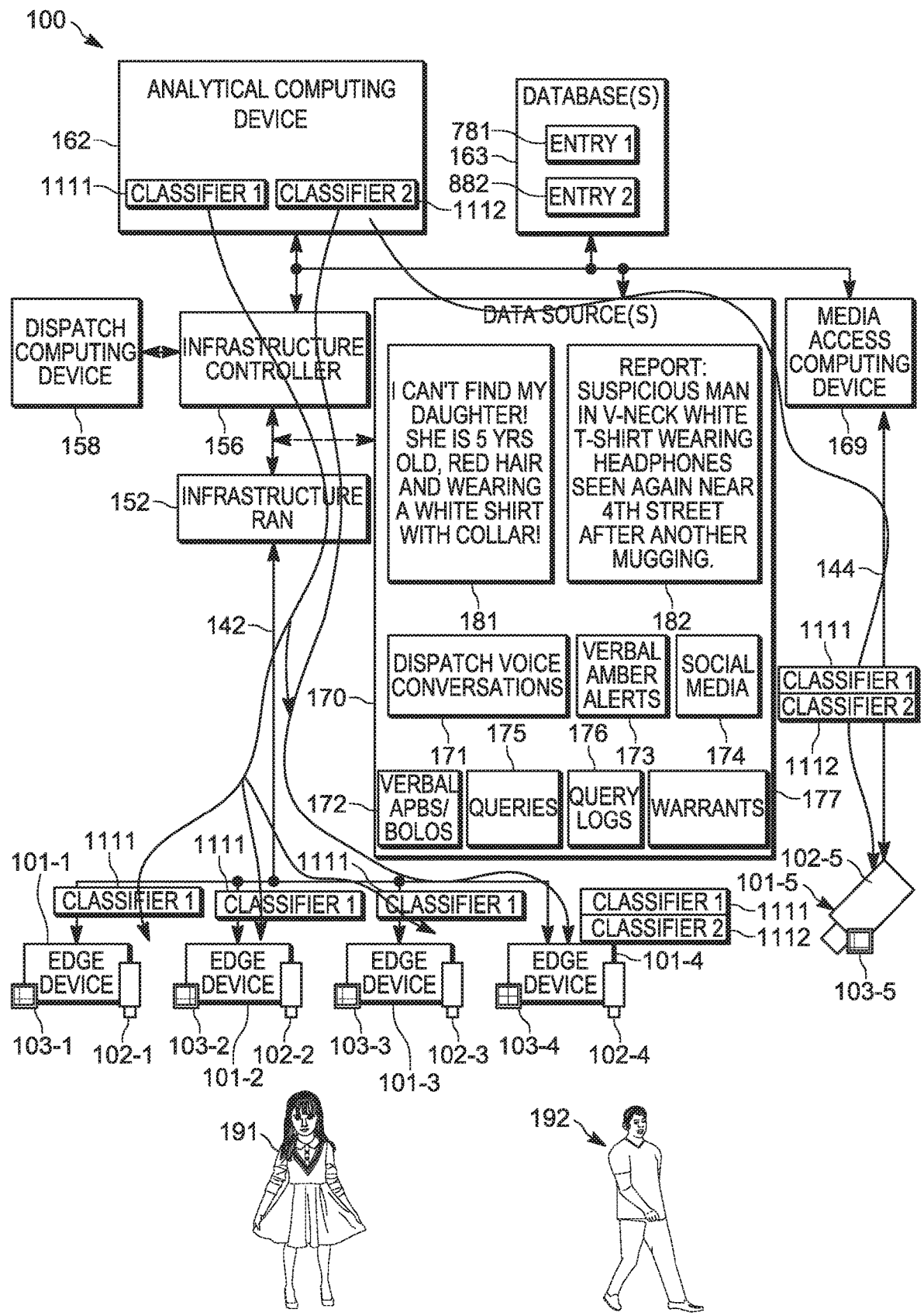
FIG. 14 depicts the analytical computing device initiating the search for the candidate subjects using object recognition engines at edge devices in accordance with some embodiments.

Such transmission of the classifiers 1111, 1112 is depicted in FIG. 14 in which the classifier 1111 is transmitted to all the edge devices 101, while the classifier 1112 is transmitted only to the edge devices 101-4, 101-5. Indeed, FIG. 14 depicts another example embodiment of the block 514 of the method 500

As such, respective object recognition engines at each of the edge devices 101 begin searching for a candidate subject defined by the classifier 1111 in multimedia data including, but not limited to, images received by the respective imaging devices 102 and audio data received by the microphones 103. Similarly, respective object recognition engines at the edge devices 101-4, 101-5 begin searching for a candidate subject defined by the classifier 1112 in multimedia data including, but not limited to, images received by the respective imaging devices 102-4, 102-5 and audio data received by the respective microphones 103-4, 103-4.

Figure 15:
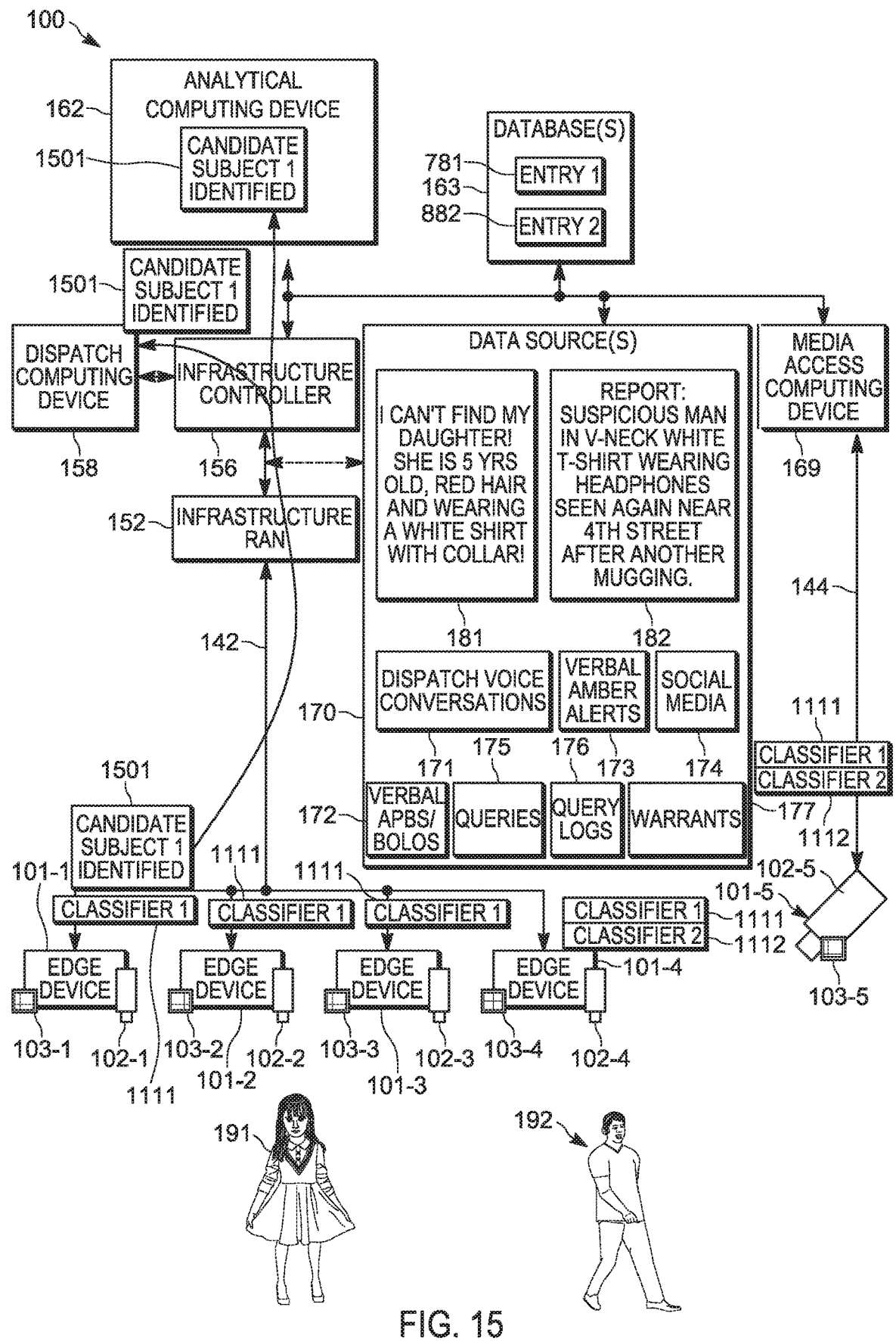
FIG. 15 depicts an edge device generating an alert when a first candidate subject is identified in accordance with some embodiments.

For example, with reference to FIG. 15, which depicts another example embodiment of the block 514 of the method 500, the object recognition engine at the edge device 101-1 may "recognize" images of the subject 191 as matching the candidate subject defined by the classifier 1111 and transmit an alert 1501 to one or more of the analytical computing device 162 and the dispatch computing device 158 that the candidate subject defined by the classifier 1111 was identified; when received at the dispatch computing device 158, the alert 1501 may be provided at a display screen and/or speaker and/or stored in conjunction with an incident management application and/or a command center application and the like. The recognition of the candidate subject defined by the classifier 1111 may also cause the respective object recognition engine at the edge device 101-1 to stop searching using the classifier 1111. The alert 1501 may also be transmitted to the other mobile edge devices 101-2, 101-3, 101-4, where the alert 1501 may be provided via respective display screens and/or speakers, and/or the alert 1501 may also be provided at the edge device 101-1 via a display screen and/or speaker. Indeed, receipt of the alert 1501 at the other mobile edge devices 101-2, 101-3, 101-4 may cause the respective object recognition engines to stop searching using the classifier 1111.

Figure 16:
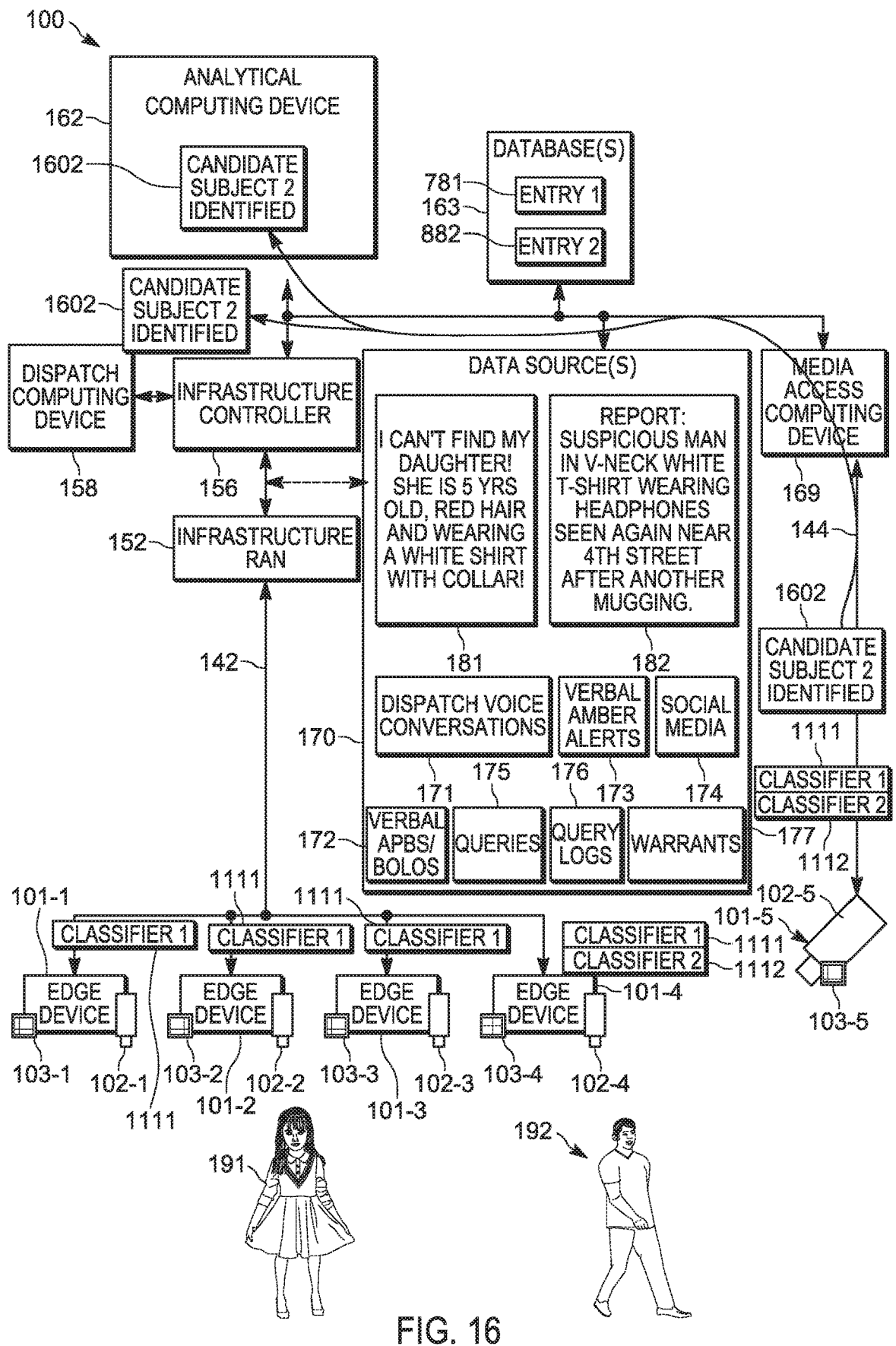
FIG. 16 depicts an edge device generating an alert when a second candidate subject is identified in accordance with some embodiments.

Similarly, with reference to FIG. 16, which depicts another example embodiment of the block 514 of the method 500, the object recognition engine at the edge device 101-5 may "recognize" images of the subject 192 as matching the candidate subject defined by the classifier 1112 and transmit an alert 1602 to one or more of the analytical computing device 162 and the dispatch computing device 158 that the candidate subject defined by the classifier 1112 was identified; when received at the dispatch computing device 158, the alert 1602 may be provided at a display screen and/or speaker and/or stored in conjunction with an incident management application and/or a command center application and the like. The recognition of the candidate subject defined by the classifier 1112 may also cause the respective object recognition engine at the edge device 101-5 to stop searching using the classifier 1112. The alert 1602 may also be transmitted to the other mobile edge devices 101-1, 101-2, 101-3, 101-4, where the alert 1602 may be provided via respective display screens and/or speakers, and/or the alert 1602 may also be transmitted to only the edge device 101-4 (e.g. only to edge devices within the geofence) and/or the alert may also be provided at the edge device 101-4 via a display screen and/or speaker. Indeed, receipt of the alert 1602 at the mobile edge devices 101-4 may cause the respective object recognition engine to stop searching using the classifier 1112.

Figure 17:
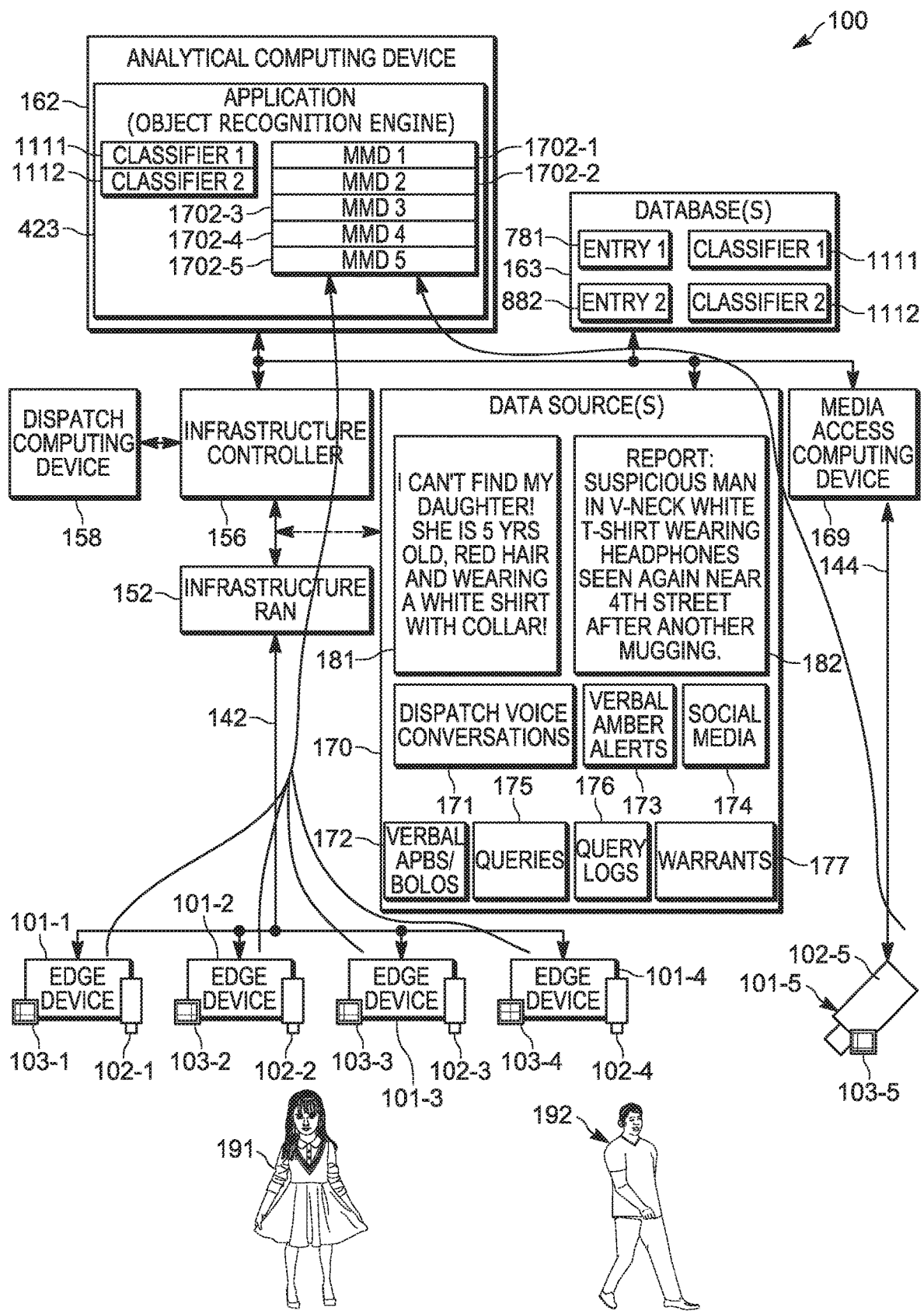
FIG. 17 depicts the analytical computing device initiating the search for the candidate subjects using an object recognition engine at a cloud device in accordance with some embodiments.
Figure 18:
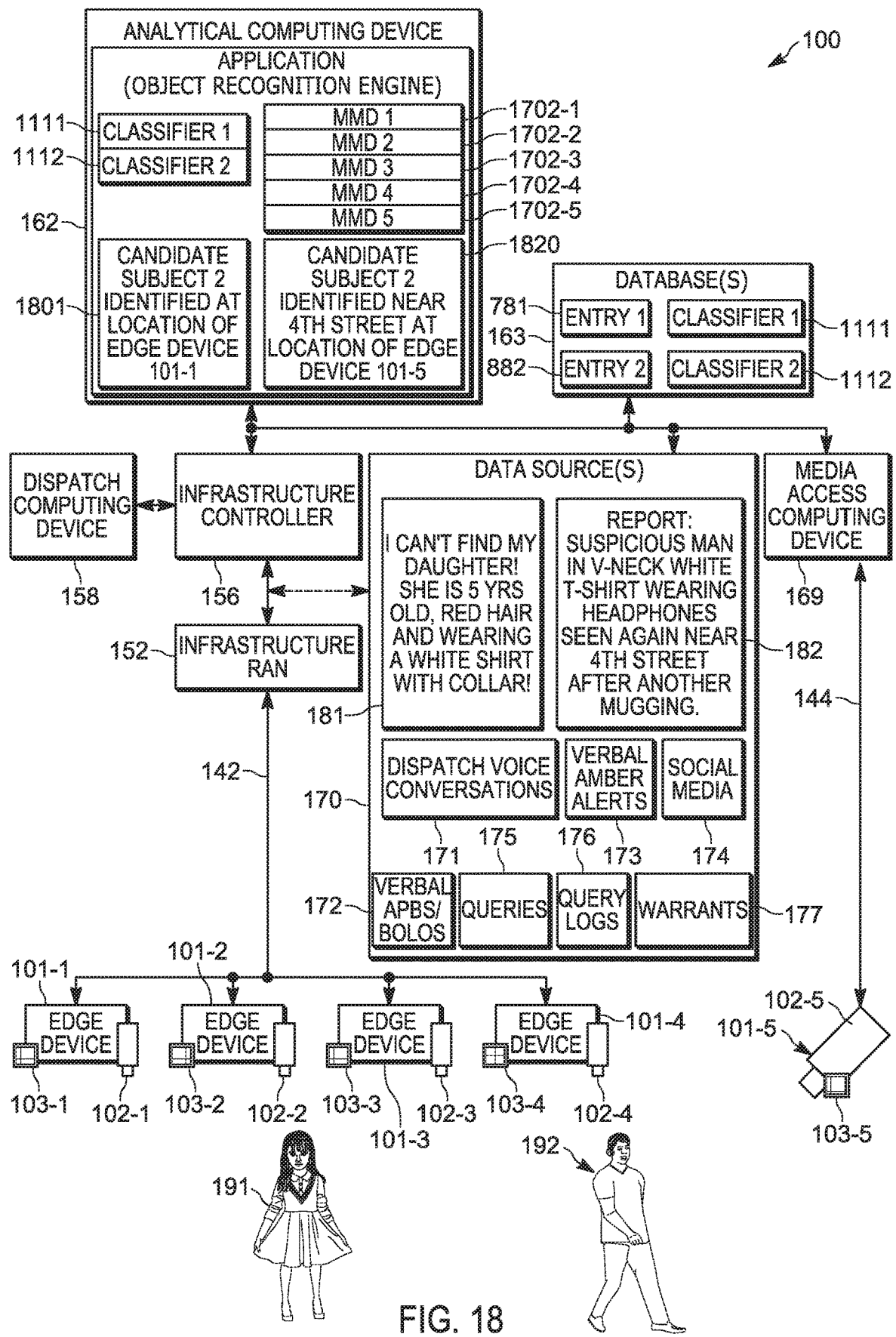
FIG. 18 depicts a cloud device generating alerts for each of the candidate subjects when identified in multimedia data received from the edge device in accordance with some embodiments.

Attention is next directed to FIG. 17 and FIG. 18 which depicts another example embodiment of the block 514 of the method 500, in which an object recognition engine is located at a cloud device in communication with the one or more edge devices 101; as depicted, the cloud device comprises the analytical computing device 162. However, the cloud device could comprise another computing device, for example the infrastructure controller 156, the dispatch computing device 158, the media access computing device 169 and/or another computing device in a cloud cluster with the analytical computing device 162.

As depicted in FIG. 17, the analytical computing device 162 is receiving multimedia data 1702-1, 1702-2, 1702-3, 1702-4, 1702-5 from respective imaging devices 102 and/or microphones 103 of the edge devices 101-1, 101-2, 101-3, 101-4, 101-5 (e.g. the multimedia data 1702-1 is received from the edge device 101-1, the multimedia data 1702-2 is received from the edge device 101-2, etc.). The multimedia data 1702-1, 1702-2, 1702-3, 1702-4, 1702-5 will be interchangeably referred to hereafter, collectively, as the multimedia data 1702 and, generically, as multimedia data 1702. Furthermore, the multimedia data 1702 may include images and/or audio and/or both and/or other types of multimedia data. The multimedia data 1702 is labelled as "MMD" in FIG. 17. Furthermore, the classifiers 1111, 1112 have been provided to the object recognition engine of the application 423 along with the multimedia data 1702. The object recognition engine of the application 423 searches for candidate subjects, using the classifiers 1111, 1112, in the respective images and/or audio data of the respective multimedia data 1702 received at a cloud device from the edge devices 101. For example, the object recognition engine of the application 423 searches for candidate subjects, using the classifiers 1111, 1112, in images received at a cloud device from the edge devices 101 and/or in audio data received at a cloud device from the edge devices 101.

Hence, for example, in FIG. 17, an object recognition engine is located at a cloud device in communication with the one or more edge devices 101, and the analytical computing device 162 is further configured to provide a classifier to the object recognition engine at the cloud device to cause the object recognition engine to search for the candidate subject, using the classifier, in respective multimedia data (e.g. images and/or audio data) received at cloud device from one or more edge devices.

Similar to the embodiments described above with respect to FIG. 15 and FIG. 16, the analytical computing device 162 may control the object recognition engine of the application 423 to search for a candidate subject associated with the communication 181 in all the multimedia data 1702, and further control the object recognition engine of the application 423 to search for a candidate subject associated with the communication 182 only in the multimedia data 1702-4, 1702-5 from edge devices 101-4, 101-5 inside a geofence.

Either way, as depicted in FIG. 18, when the object recognition engine of the application 423 "recognizes" the subject 191 in multimedia data 1702-1 from the edge device 101-1, the analytical computing device 162 may generate an alert 1801, which may (as depicted) include the location of the edge device 101-1, and transmit (not depicted) the alert to the edge devices 101 and/or the dispatch computing device 158 in a manner similar to that described above with respect to the alert 1501. Similarly, when the object recognition engine of the application 423 "recognizes" the subject 192 in multimedia data 1702-5 from the edge device 101-5, the analytical computing device 162 may generate an alert 1802, which may (as depicted) include the location of the edge device 101-5, and transmit (not depicted) the alert to the edge devices 101 and/or the dispatch computing device 158 in a manner similar to that described above with respect to the alert 1602.

Figure 19:
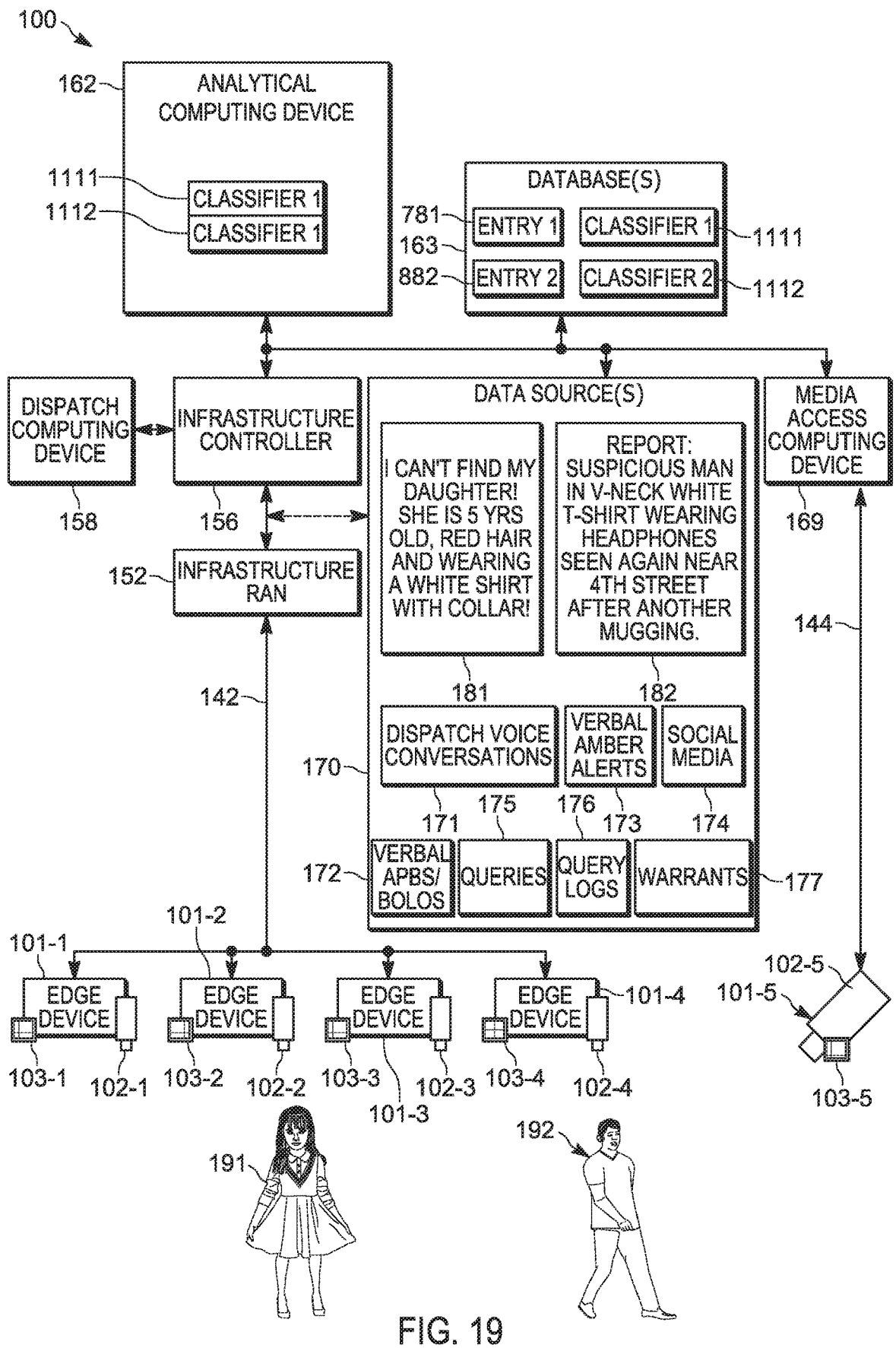
FIG. 19 depicts the analytical computing device storing the classifiers at a cloud repository in accordance with some embodiments.

As described above, the analytical computing device 162 is generally configured to maintain a database of potential candidate subjects based on the data 601 received from the one or more data sources 170. For example, with reference to FIG. 19, the entries 781, 882 have been stored at the databases 163, for example in a database of candidate subjects. As also depicted in FIG. 19, the analytical computing device 162 may also provide the classifiers 1111, 1112 to the databases 163, for example for storage in association with the entries 781, 882. In other words, the classifier 1111 may be stored in association with the entry 781, and the classifier 1112 may be stored in association with the entry 882. Hence, when another candidate subject is later identified from the data sources, that is definable using one of the entries 781, 882, the associated classifier 1111, 1112 may be retrieved from the databases 163 to obviate regeneration of a classifier 1111, 1112. Hence, for example, the analytical computing device 162 may be further configured to one or more of: is further configured to one or more of: maintain a database of potential candidate subjects based on data received from the one or more data sources 170; and provide a classifier to a cloud repository device (e.g. one or more of the databases 163) for use in searches for further candidate subjects, similar to a candidate subject previously identified. Furthermore, the classifiers 1111, 1112 may be updated at the databases 163 as described above.

Figure 20:
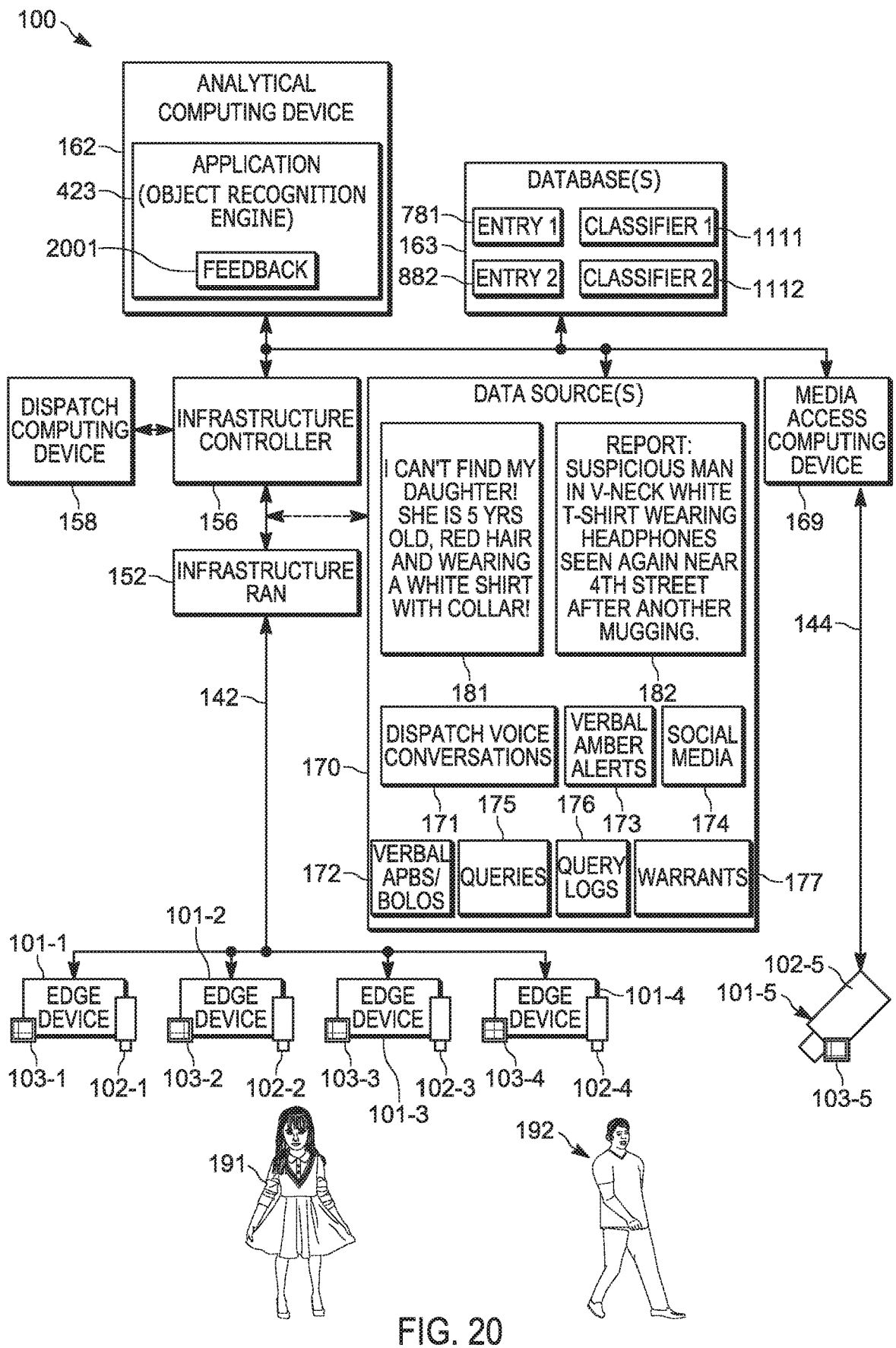
FIG. 20 depicts feedback being provided to an object recognition engine in accordance with some embodiments.

Attention is next directed to FIG. 20 which depicts feedback 2001 being provided to the object recognition engine of the application 423, the feedback 2001 defining a level of success of searching for a candidate subject (e.g. one or more of the candidate subjects defined by the classifiers 1111, 1112) by the object recognition engine, the feedback 2001 received from one or more of the object recognition engine, the one or more edge devices 101, and an electronic incident report.

For example, the feedback 2001 may indicate whether a subject 191, 192 was correctly identified as a candidate subject using the classifiers 1111, 1112.

The origin of the feedback 2001 may depend on which object recognition engine in the system 100 identified a subject 191, 192 using the classifiers 1111, 1112. For example, when the object recognition engine of the application 423 at the analytical computing device 162, identified a subject 191, 192 using the classifiers 1111, 1112, the object recognition engine of the application 423 at the analytical computing device 162 may provide the feedback 2001 to itself.

However, when the object recognition engine at one or more of the edge devices 101 identified a subject 191, 192 using the classifiers 1111, 1112, the object recognition engine at the one or more of the edge devices 101 may provide the feedback 2001 to the other object recognition engines at the other edge devices 101.

However, the feedback 2001 may also originate from an incident report which includes data on whether or not the subject 191, 192 that was identified was an actual subject who was, for example, missing and/or a suspect in a crime. In these embodiments, the feedback 2001 originates external to any object recognition engines.

Regardless, the feedback 2001 is provided in a format that an object recognition engine may use to improve searching for candidate subjects.

Furthermore, regardless of the origin of the feedback 2001, the feedback 2001 may be provided to any object recognition engine in the system 100 that was searching for a candidate subject using the classifiers 1111, 1112.

Provided herein is a device, system and method for generating an alert and an automatic search for a candidate subject. An analytical computing device rates candidate subjects identified in monitored data sources. When the rating meets a first threshold, an electronic alert of a candidate subject is generated. When the rating meets a second threshold, lower than the first threshold, an electronic search for the candidate subject is initiated. In general, classifiers used by object recognition engines and/or machine learning algorithms are used to search for the candidate subjects in multimedia data from edge devices. Such classifiers may be generated and/or retrieved from a cloud repository.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
    a communication unit; a memory storing rules for rating candidate subjects; and a controller configured to:
        monitor, via the communication unit, one or more of verbal communications and textual communications of one or more data sources to identify a candidate subject;
        in response to identifying the candidate subject, extract descriptors of the candidate subject from one or more of the verbal communications and the textual communications received from the one or more data sources;
        determine, from the rules, a rating of importance of the candidate subject based on the descriptors;
        when the rating of importance meets a first threshold: transmit, via the communication unit, to one or more communication devices, an alert identifying the candidate subject; and
        when the rating of importance meets a second threshold, lower than the first threshold: generate a classifier, defining the candidate subject, from the descriptors extracted from one or more of the verbal communications and the textual communications received from the one or more data sources; and provide the classifier defining the candidate subject to an object recognition engine to cause the object recognition engine to automatically search for the candidate subject, using the classifier, in multimedia data received at one or more edge devices.

2. The device of claim 1, wherein the controller is further configured to:
    when the classifier is already stored at a database, update the classifier at the database using the descriptors of the candidate subject extracted from one or more of the verbal communications and the textual communications received from the one or more data sources.

3. The device of claim 1, wherein the controller is further configured to:
    when the rating of importance does not meet the first threshold, refrain from generating the alert identifying the candidate subject.

4. The device of claim 1, wherein the controller is further configured to monitor one or more of the verbal communications and the textual communications of the one or more data sources to identify the candidate subject by monitoring one or more of:
    audio received from one or more microphones;
    images received from one or more imaging devices;
    electronic transmissions from one or more communication networks;
    video transmissions from one or more communication networks;
    audio transmissions from one or more communication networks;
    data transmissions from one or more communication networks;
    verbal amber-alerts;
    queries to one or more databases that identify subjects of interest; and
    logs to the queries to the one or more databases.

5. The device of claim 1, wherein the controller is further configured to:
    determine the one or more edge devices to be used to search for the candidate subject using a geofence, the geofence generated from geographic data associated with the candidate subject received from the one or more data sources, the one or more edge devices being inside the geofence.

6. The device of claim 1, wherein the one or more edge devices include respective object recognition engines, and the controller is further configured to provide the classifier to the object recognition engine by:
    transmitting the classifier to the one or more edge devices to cause each of the respective object recognition engines to search for the candidate subject, using the classifier, in respective multimedia data received at the one or more edge devices.

7. The device of claim 1, wherein the object recognition engine is located at a cloud device in communication with the one or more edge devices, and the controller is further configured to:

provide the classifier to the object recognition engine at the cloud device to cause the object recognition engine to search for the candidate subject, using the classifier, in respective multimedia data received at the cloud device from the one or more edge devices.

8. The device of claim 1, wherein the controller is further configured to:
provide feedback to the object recognition engine, the feedback defining a level of success of searching for the candidate subject by the object recognition engine, the feedback received from one or more of the object recognition engine, the one or more edge devices, and an electronic incident report.

9. The device of claim 1, wherein the controller is further configured to one or more of:
maintain a database of potential candidate subjects based on data received from the one or more data sources; and
provide the classifier to a cloud repository device for use in searches for further candidate subjects, similar to the candidate subject.

10. The device of claim 1, wherein the controller is further configured to determine the rating of importance of the candidate subject from the rules based on one or more of:
a severity of suspected crimes associated with the candidate subject;
a criminal history of the candidate subject;
a personal context of the candidate subject;
whether descriptions of the candidate subject are in jest;
whether the candidate subject is one or more of: captured, incarcerated and deceased; and
further information received after the candidate subject is identified.

11. A method comprising:
monitoring, at a controller, via communication unit, one or more of verbal communications and textual communications of one or more data sources to identify a candidate subject;
in response to identifying the candidate subject, extract descriptors of the candidate subject from one or more of the verbal communications and the textual communications received from the one or more data sources;
determining, at the controller, from rules for rating candidate subjects stored in a memory, a rating of importance of the candidate subject based on the descriptors;
when the rating of importance meets a first threshold:
transmitting, using the controller, via the communication unit, to one or more communication devices, an alert identifying the candidate subject; and
when the rating of importance meets a second threshold, lower than the first threshold: generating a classifier, defining the candidate subject, from the descriptors extracted from one or more of the verbal communications and the textual communications received from the one or more data sources; and providing, using the controller, the classifier defining the candidate subject to an object recognition engine to cause the object recognition engine to automatically search for the candidate subject, using the classifier, in multimedia data received at one or more edge devices.

12. The method of claim 11, further comprising:
when the classifier is already stored at a database, updating the classifier at the database using the descriptors of the candidate subject extracted from one or more of the verbal communications and the textual communications received from the one or more data sources.

13. The method of claim 11, further comprising:
when the rating of importance does not meet the first threshold, refraining from generating the alert identifying the candidate subject.

14. The method of claim 11, wherein monitoring one or more of the verbal communications and the textual communications of the one or more data sources to identify the candidate subject comprises monitoring one or more of:
audio received from one or more microphones;
images received from one or more imaging devices;
electronic transmissions from one or more communication networks;
video transmissions from one or more communication networks;
audio transmissions from one or more communication networks;
data transmissions from one or more communication networks;
verbal amber-alerts; queries to one or more databases that identify subjects of interest; and
logs to the queries to the one or more databases.

15. The method of claim 11, further comprising:
determining the one or more edge devices to be used to search for the candidate subject using a geofence, the geofence generated from geographic data associated with the candidate subject received from the one or more data sources, the one or more edge devices being inside the geofence.

16. The method of claim 11, wherein the one or more edge devices include respective object recognition engines, and the method further comprising providing the classifier to the object recognition engine by:
transmitting the classifier to the one or more edge devices to cause each of the respective object recognition engines to search for the candidate subject, using the classifier, in respective multimedia data received at the one or more edge devices.

17. The method of claim 11, wherein the object recognition engine is located at a cloud device in communication with the one or more edge devices, and the method further comprises:
providing the classifier to the object recognition engine at the cloud device to cause the object recognition engine to search for the candidate subject, using the classifier, in respective multimedia data received at the cloud device from the one or more edge devices.

18. The method of claim 11, further comprising:
providing feedback to the object recognition engine, the feedback defining a level of success of searching for the candidate subject by the object recognition engine, the feedback received from one or more of the object recognition engine, the one or more edge devices, and an electronic incident report.

19. The method of claim 11, further comprising one or more of:
maintaining a database of potential candidate subjects based on data received from the one or more data sources; and
providing the classifier to a cloud repository device for use in searches for further candidate subjects, similar to the candidate subject.

20. The method of claim 11, further comprising determine the rating of importance of the candidate subject from the rules based on one or more of:
a severity of suspected crimes associated with the candidate subject;
a criminal history of the candidate subject;
a personal context of the candidate subject;

whether descriptions of the candidate subject are in jest;
whether the candidate subject is one or more of: captured, incarcerated and deceased; and
further information received after the candidate subject is identified.

* * * * *